United States Patent
Van Horssen et al.

(10) Patent No.: US 10,324,665 B2
(45) Date of Patent: Jun. 18, 2019

(54) DOCUMENT PROCESSING SYSTEM FOR PROCESSING A PRINT JOB

(71) Applicant: OCÉ-TECHNOLOGIES B.V., Venlo (NL)

(72) Inventors: Ernst P. Van Horssen, Venlo (NL); Maurice L. M. Luttmer, Venlo (NL); Jan H. Geels, Venlo (NL); Matthieu W. J. Helder, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/476,000

(22) Filed: Mar. 31, 2017

(65) Prior Publication Data

US 2017/0206041 A1    Jul. 20, 2017

Related U.S. Application Data

(63) Continuation of application No. PCT/EP2015/071850, filed on Sep. 23, 2015.

(30) Foreign Application Priority Data

Oct. 1, 2014 (EP) .................................. 14187281

(51) Int. Cl.
*G06F 3/12* (2006.01)

(52) U.S. Cl.
CPC ............ *G06F 3/1208* (2013.01); *G06F 3/125* (2013.01); *G06F 3/1252* (2013.01);
(Continued)

(58) Field of Classification Search
None
See application file for complete search history.

(56) References Cited

U.S. PATENT DOCUMENTS

| | | | |
|---|---|---|---|
| 6,549,299 B1 * | 4/2003 | Allen | ...................... B42C 19/02 358/1.18 |
| 2004/0174552 A1 * | 9/2004 | Miyake | ...................... B41J 3/46 358/1.12 |

(Continued)

FOREIGN PATENT DOCUMENTS

| | | |
|---|---|---|
| EP | 1 136 283 A2 | 9/2001 |
| EP | 2 098 952 A2 | 9/2009 |

*Primary Examiner* — Huo Long Chen
(74) *Attorney, Agent, or Firm* — Birch, Stewart, Kolasch & Birch, LLP

(57) ABSTRACT

A method for processing with a document processing system is provided. The method includes generating a sheet assembly by executing a production route model of at least one function leading to a plurality of actions, the sheet assembly including a set of transitions that result from invocation of the plurality of actions, extracting from the sheet assembly a document imposition recipe including a set of imposition descriptions generated by computing transformations and parameters for each transition performed on the sheet assembly, and rendering the imposition descriptions of the document imposition recipe on behalf of at least one source file in order to deliver impositions in a source format describing at least placement of content of pages of the source file and action marks for subsequent displaying of the impositions on a user interface of the document processing system and/or for subsequent processing on the at least one printer and/or an the at least one finisher. A document processing system is configured to execute the method.

14 Claims, 15 Drawing Sheets

(52) U.S. Cl.
CPC .......... *G06F 3/1256* (2013.01); *G06F 3/1264* (2013.01); *G06F 3/1275* (2013.01); *G06F 3/1285* (2013.01); *G06F 3/1297* (2013.01)

(56) References Cited

U.S. PATENT DOCUMENTS

| | | |
|---|---|---|
| 2004/0199865 A1 | 10/2004 | Bie et al. |
| 2005/0243354 A1* | 11/2005 | O'Neill ................. G06F 3/1205 358/1.13 |
| 2007/0139683 A1* | 6/2007 | Wegeng ............. H04N 1/00355 358/1.13 |
| 2014/0293304 A1* | 10/2014 | Seto .................... G06K 15/025 358/1.12 |

* cited by examiner

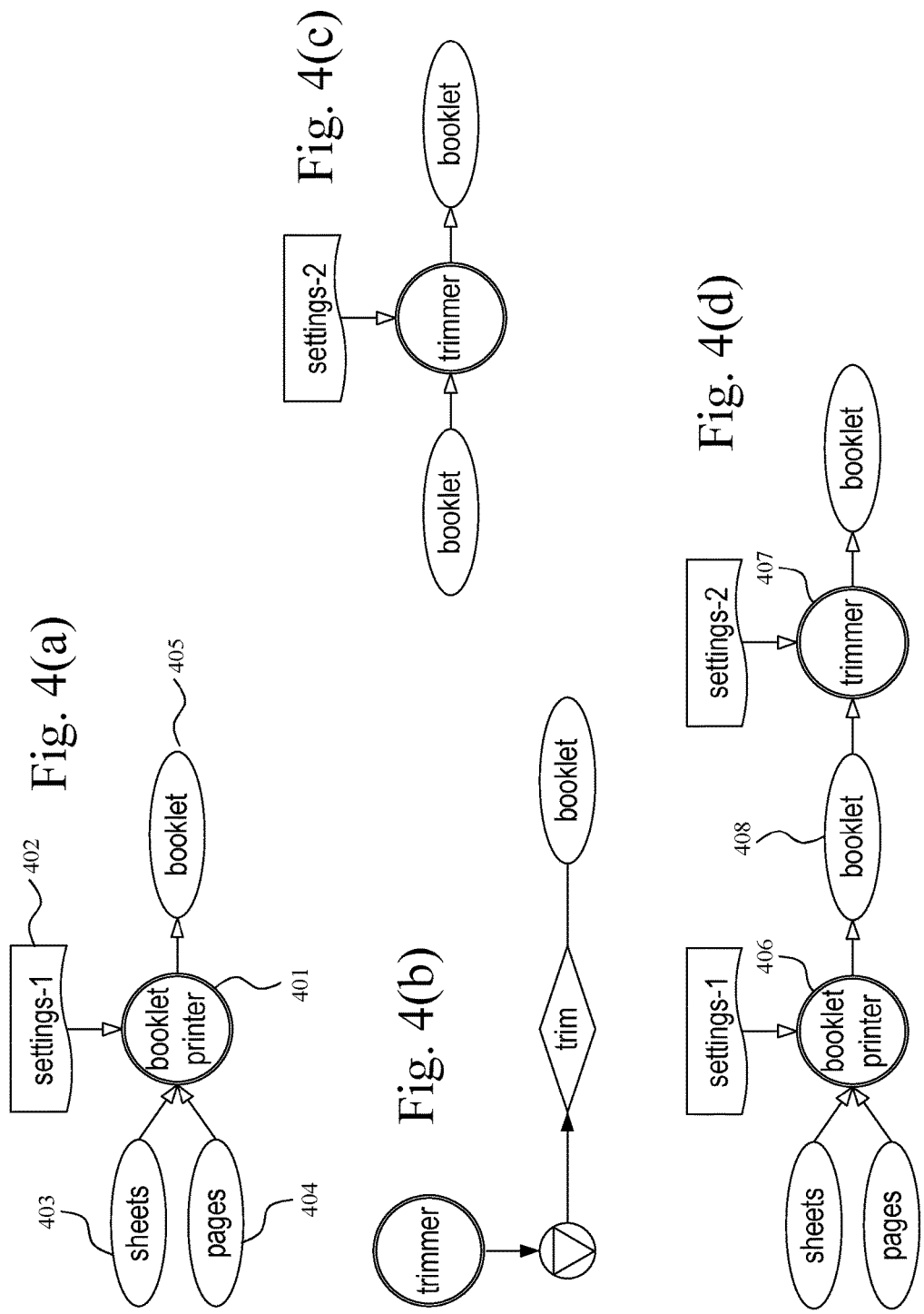

DOCUMENT PROCESSING SYSTEM FOR PROCESSING A PRINT JOB

CROSS-REFERENCE TO RELATED APPLICATIONS

This application is a continuation of PCT International Application No. PCT/EP2015/071850, filed on Sep. 23, 2015. PCT/EP2015/071850 claims priority under 35 U.S.C. § 119(a) to application Ser. No. 14/187,281.2, filed in Europe on Oct. 1, 2014. The entire contents of each of the above-identified applications are hereby incorporated by reference into the present application.

BACKGROUND OF THE INVENTION

1. Field of the Invention

The present invention relates to a document processing system for processing a print job to produce a document comprising at least one sheet, the print job having print job settings specifying a plurality of actions on a physical start product and specifying a desired end product, the document processing system comprising at least one printer and at least one finisher. The physical start product is at least one stack of sheets of at least one print medium type. The physical start product may be loaded in an input holder of the document processing system or inserted via an automatic document feeder of the document processing system.

The present invention further relates to a method for processing a print job in the document processing system according to the invention.

2. Description of Background Art

A document processing system is known to comprise a printer and one or more finishers. The printed sheets can be processed on one or more finishers to produce a variety of end products, like loose leaf documents, booklets, brochures, folders, perfect bound books, etc. Moreover, the sheets can be processed by one or more finishers before printing, for example pre-punching or pre-perforating. Hereinafter, finishing is understood to include finishing actions before printing and finishing actions after printing. Hereinafter finishing actions mentioned in any specification of finishing actions are to be envisioned, for example in a job definition format (JDF) specification.

The variety in finisher devices is large. Finishers may be in-line, online, near-line, or off-line. Finishers may provide only a single action like a guillotine trimmer or a series of actions like a perfect bound book maker. Finishers may have different operating ranges and constraints. The number of finishing actions is finite like folding, cutting, trimming, stapling, punching, creasing, etc. A finishing action is an operation on a sheet or on a stack of sheets or on an assembly of sheets, like a book block with a cover glued around it. An example of an enumeration of finishing actions is given in "JDF specification" Release 1.5—Dec. 31, 2013.

A document processing system is known to comprise a routing module for producing a production route model. A production route model consists of the selection of production devices to be used for the production of the required physical end product, and the determination of the sequence or network order in which to apply the production devices, and the settings to be applied to the production devices as part of the sequence or network order for producing the required physical end product. A production device is a printer or a finisher or any other device that is capable of participating in a production route model.

A document production system is known to comprise an imposition step. Imposition consists of the arrangement of page content of the incoming document to the sheets to be printed in such a way that the page content is positioned in the physical end product according to the intentions of the designer of the physical end product. Also, the imposition step may add marks to the imposition in such a way that the marks assist the operator(s) of the print production system to set up the print production equipment before the production actions are performed and to assist the operator(s) of the print production system to judge the quality of the set up after the production actions have been performed. Moreover, the imposition step may add information to the page content in such a way that the information assists the operator(s) of the print production equipment to identify the work in progress, to route the work in progress to a next production step and to identify the settings required by a next production step. Examples of such information are: file name, production date, order identifier, etc. Such information may be rendered in human readable form (like text or icon) and may be rendered in machine readable form (like barcode or QR code).

The imposition step has to comply with the production route model. When the imposition step does not comply with the selection of finishing devices or does not comply with the sequence or network of finishers or does not comply with the settings of the finishers, then the imposition step may position the page content at a position different from the one intended by the designer of the resulting physical end product, and the imposition step may position the marks at a position different from the one that would assist the operator in setting up the finishing device and in judging the quality.

Since the imposition step is performed separately from the creation of the production routing model, an error may occur if the imposition step does not comply with the production routing model. This also results in duplication of efforts, as the imposition step and the production routing model both involve a similar decision making process of how to produce a required physical output with the printing and finishing equipment available.

The imposition step may comprise a template mechanism. An imposition template is a predefined imposition that complies with a predefined production route model. A predefined production route model may contain predefined variations and hence the template must match these variations. The template mechanism fails if the imposition template does not comply with the production route model, or if the variations of the production route model are not properly propagated to variations in the imposition template. The template mechanism fails if a physical end product requires a production route model that falls outside the predefined variations of the predefined production route models. The template mechanism is time consuming to configure initially, and time consuming to maintain over time. It takes effort to validate the compliance of an imposition template and a predefined production route model, even more so if the predefined production route model contains a multitude of predefined variations.

A document processing system is known to comprise a spread preview. A spread is a pair of pages that can be observed simultaneously when leafing through a physical end product. A page is the side of a leaf. A leaf is the physical entity that is turned over when leafing through the physical end product. A spread preview is a representation of a spread for the purpose of visually checking that the physical end product will meet content placement criteria after production. Content placement criteria may include: a sequencing of page content over the pages, a position, an orientation and a scale of page content on the pages, an interference of binding artefacts with page content, and an interference of production tolerances with page content. Binding artefacts may include: holes in a sheet, limited ability to lay a document flat, a gutter between pages, visibility of a spine for wire-comb binding, etc. Production tolerances may include: image to sheet registration, a deviation between intended and actual property of an object such as sheet size, etc.

At present, the computations for a spread preview may be different from the computations for an imposition. This may lead to inconsistencies, where the spread preview does not show the imposition correctly.

SUMMARY OF THE INVENTION

It is an objective of the present invention to provide a document processing system that is capable of automatically deriving from a production route model an imposition that complies to said production route model.

It is also an objective of the present invention to derive a spread preview from the imposition.

According to the present invention the objective is achieved by the document processing system for processing a print job to produce a document comprising:

a simulation module configured to generate a sheet assembly with a production route model of at least one function leading to the plurality of actions, the generation of the sheet assembly using as input a plurality of settings, at least one representation of the at least one sheet of the physical start product and pages derived from at least one source file, the sheet assembly comprising a set of transitions that result from performing the plurality of actions, each transition being one out of a modification of a value of a property of a sheet, a creation of a relationship between sheets, a termination of a relationship between sheets, a creation of a sheet, and a destruction of a sheet;

an extraction module configured to extract from the sheet assembly a document imposition recipe comprising a set of imposition descriptions generated by computing, for each transition performed on the sheet assembly, transformations that express a change of a coordinate system used for the transition and parameters that specify the actions related to the transition; and a rendition module configured to render the imposition descriptions of the document imposition recipe, the rendering based on the at least one source file and a render purpose, in order to deliver imposition images in a target format, the imposition images comprising at least placement of content of pages of the at least one source file and action marks related to the plurality of actions, the imposition images being suitable for subsequent display of the impositions on a user interface of the document processing system and/or being suitable for input for subsequent processing on the at least one printer and/or on the at least one finisher.

The at least one finisher may be in-line, online, near-line, or off-line. For an off-line finisher the document processing system has in memory a production route model of the off-line finisher to be executed. Such a production route model for the off-line finisher may be stored in the memory of the document processing system beforehand. The modules of the document processing system—the simulation module, the extraction module and the rendition module—may reside in a control unit of the at least one printer. The modules of the document processing system may partly reside in the control unit of the at least one printer and partly on at least one computer in a network to which the at least printer and/or the at least one finisher is connected. The modules of the document processing system may also completely reside in the network connected to the at least one printer and/or to the at least one finisher.

According to an embodiment, the document imposition recipe comprises for each sheet that is intended to be printed by the at least one printer a sheet imposition recipe generated by computing transformations and parameters for each transition performed on said sheet. From the document imposition recipe, a plurality of sheet imposition recipes may be derived.

According to an embodiment, the rendition module is configured to render each sheet imposition recipe for a front face of the sheet and for a back face of the sheet.

According to an embodiment, each sheet imposition recipe comprises a sheet front imposition recipe generated by computing transformations and parameters for each transition performed on a front side of the sheet and a sheet back imposition recipe generated by computing transformations and parameters for each transition performed on the back side of the sheet. From each sheet imposition recipe the sheet front imposition recipe and the sheet back imposition recipe may be derived.

According to an embodiment, the extraction module is configured to extract from the sheet assembly a spread preview recipe comprising a set of spread preview descriptions comprising a subset of the transitions from the sheet assembly suitable for rendering the set of spread preview descriptions, and the document processing system comprises a second rendition module which is configured to render the spread preview descriptions in the spread preview recipe on behalf of the impositions in order to deliver spread previews in a target format describing at least placement of page content and action marks for subsequent viewing on the user interface and/or for subsequent processing on the at least one printer and/or on the at least one finisher.

According to a further embodiment, the target format of the delivered spread preview further describes binding adornments.

According to an embodiment, the plurality of actions comprises at least one print action and at least one finishing action out of a folding action, a cutting action, a trimming action, a punching action, a stapling action, a drilling action, a stacking action, a creasing action, a glue binding action and a wire-comb binding action. Other finishing actions described in any JDF specification may be envisioned.

The invention also relates to a method for processing with a document processing system comprising at least one printer and at least one finisher, a print job to produce a document comprising at least one sheet, the print job specifying a plurality of actions on a physical start product and specifying a desired end product, the method comprising the steps of generating a sheet assembly with a production route model of at least one function leading to the plurality of actions, the generation of the sheet assembly using as input a plurality of print job settings, at least one representation of the at least one sheet of the physical start product, and pages derived from at least one source file, the sheet assembly comprising a set of transitions that result from performing the plurality of actions, each transition being one out of a modification of a value of a property of a sheet, a creation of a relationship between sheets, a termination of a relationship between sheets, a creation of a sheet, and a destruction of a sheet, extracting from the sheet assembly a document imposition recipe comprising a set of imposition descriptions generated by computing for each transition performed on the sheet assembly transformations that express a change of a coordinate system used for the transition and parameters that specify the actions related to the transition, and rendering the imposition descriptions of the document imposition recipe, the rendering based on the at least one source file in order to deliver imposition images in a target format, the imposition images comprising at least placement of content of pages of the at least one source file and comprising action marks, the imposition images being suitable for subsequent displaying of the imposition images on a user interface of the document processing system and/or being suitable for input for subsequent processing on the at least one printer and/or on the at least one finisher.

According to an embodiment of the method, the document imposition recipe comprises for each sheet that is going to be printed by the at least one printer a sheet imposition recipe generated by computing transformations and parameters for each transition performed on said sheet.

According to an embodiment of the method, the rendering step comprises for each sheet imposition recipe the step of rendering a front face of the sheet and the step of rendering a back face of the sheet.

According to an embodiment of the method, each sheet imposition recipe comprises a sheet front imposition recipe generated by computing transformations and parameters for each transition performed on a front side of the sheet and a sheet back imposition recipe generated by computing transformations and parameters for each transition performed on the back side of the sheet.

According to an embodiment, the method comprises the steps of extracting from the sheet assembly a spread preview recipe comprising a set of spread preview descriptions comprising a subset of the transitions from the sheet assembly suitable for rendering the set of spread preview descriptions, and rendering the spread preview descriptions in the spread preview recipe on behalf of the impositions in order to deliver spread previews in a target format describing at least placement of page content and action marks for subsequent viewing on the user interface and/or for subsequent processing on the at least one printer and/or on the at least one finisher.

The invention also relates to a non-transitory recording medium comprising computer executable program code configured to instruct at least one computer to perform the method according to the invention with the corresponding document processing system according to the invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4(a) shows a function signature according to the invention;

FIG. 4(b) is a function model according to the invention;

FIG. 4(c) is another function signature according to the invention;

FIG. 4(d) is a production route model according to the invention;

DETAILED DESCRIPTION OF THE PREFERRED EMBODIMENTS

The present invention will now be described with reference to the accompanying drawings.

Figure 1:
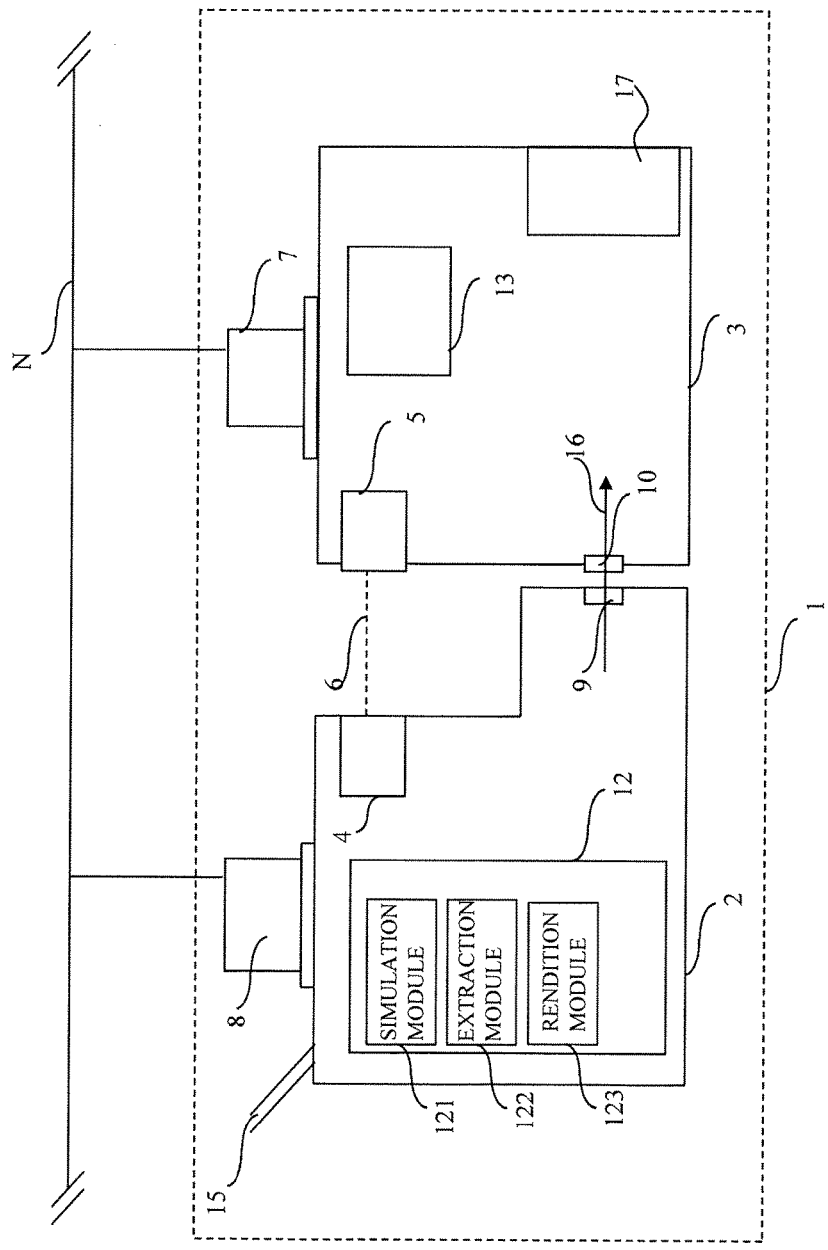
FIG. 1 is a schematic view of a document processing system according to the invention.
Figure 2A:
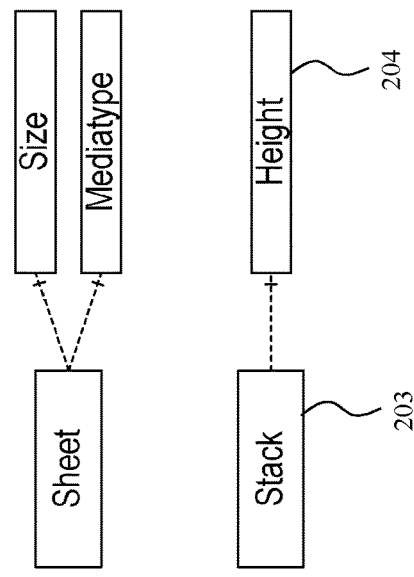
FIG. 2(a) shows action types as symbols according to the invention.
Figure 2B:
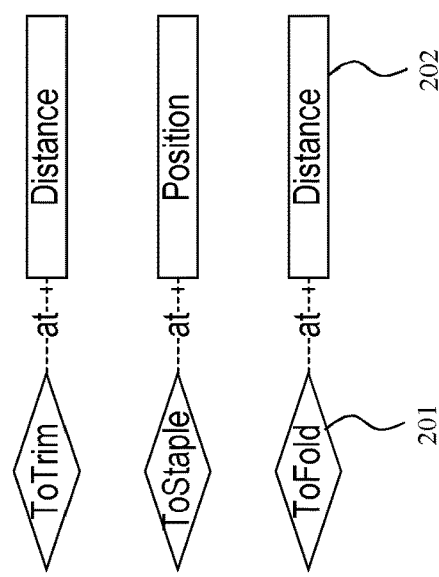
FIG. 2(b) shows object types as symbols according to the invention.
Figure 2C:
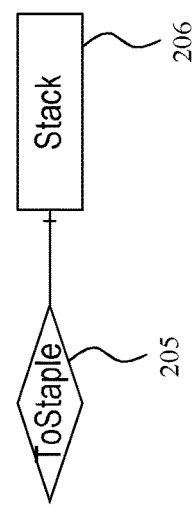
FIG. 2(c) shows an object-action association as symbols according to the invention.
Figure 2D:
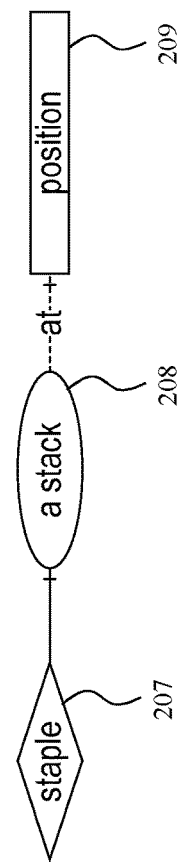
FIG. 2(d) shows an action phrase as symbols according to the invention.

FIG. 1 is a schematic view of an embodiment of the document processing system 1 according to the invention. The view shows the document processing system 1 comprising a printer (or print module) 2, connected to a network N, an inline (or off-line) finisher 3 connected to the network N or remotely connected to the printer 2, a print interface 4 in the printer 2, a finishing interface 5 in the finisher 3, an optional data connection 6 between the print interface 4 and the finishing interface 5, a finishing module console 7, a print module console 8, a sheet outlet 9, a sheet inlet 10, a control unit 12 in the printer 2, a finisher memory 13 in the finisher 3, an optional automatic document feeder 15 on printer 2 for feeding sheets of the physical start product to the printer 2, an input holder (not shown) for holding the physical start product like a stack of sheets and an output holder 17 on the finisher 3 for receiving and holding output of a plurality of sheets, for example a stack of printed and finished sheets. The print interface 4 and the finishing interface 5 are configured to exchange digital information about printing and finishing instructions, which printing and finishing instructions are needed for processing the print job in order to lead to the desired end product. The print interface 4 and finishing interface 5 may exchange data via the network N. A printed sheet arrives at the sheet outlet 9 in order to enter the finishing module 3 via the sheet inlet 10, the sheet flow direction indicated by arrow 16.

Pre-printing instructions, printing instructions and finishing instructions may be part of specifications of a print job received via the network N by the document processing system 1. Printing and finishing instructions may also be entered via print module console 8 and stored in the control unit 12 of the printer 2. Finishing instructions may also be entered via finishing module console 7 and stored in the finisher memory 13 of the finisher 3.

The control unit 12 may comprise a simulation module, an extracting module and a rendition module according to the invention. The simulation module, the extracting module and the rendition module may be part of a software application residing in memory of the control unit 12 or may be implemented in one or more hardware units, or may be implemented as a combination of hardware and software in the control unit 12.

In an embodiment, at least one of the simulation module, the extracting module and the rendition module is part of a software or hardware application residing on at least one computer in a network coupled to the printer 2 and/or the finisher 3. The simulation module, the extracting module and the rendition module may also be distributed among a plurality of computers in the network. In this particular embodiment, the at least one computer in the network is part of the document processing system 1. The network may expand into a cloud system or into an intranet or into the Internet. The print module console 8 may be used to display impositions and spread previews created in the document processing system 1 according to the invention. However, the created impositions and spread previews may also be displayed on a user interface comprised in the at least one computer in the network. A mix of displaying impositions and/or spread previews inside and outside the print module 2 may be envisioned.

The inline finisher 3 may be a trimming device, a cutting device, a punching device, a folding device or any other finishing device, or a device which combines the before-mentioned finishing actions. It is also in the scope of the invention that the document processing system 1 comprises a plurality of off-line finishers which is concatenated to a sequence or network of off-line finishers positioned to allow sequential and/or parallel finishing. The plurality of off-line finishers is used after a printing process on the printer 2. It is also in the scope of the invention that the document processing system 1 comprises a plurality of printers which is concatenated or positioned to allow sequential and/or parallel processing of the print job.

The at least one printer and the at least one finisher are available for use in the production route model according to the invention.

FIGS. 2(*a*)-2(*d*), 3(*a*)-3(*c*), and 4(*a*)-4(*d*) show a notation of symbols which has been described in the book "KISS methode voor Object Oriëntatie" author Gerald Kristen (Academic Service/ISBN 90 395 0026 6) and the book "Kennis is macht," author Gerald Kristen (Academic Service/ISBN 90 395 0700 7).

FIG. 2(*a*) shows a diamond notation for an action type 201, like "ToTrim," "ToStaple," and "ToFold," together with a corresponding parameter type 202, like "distance," and "position." FIG. 2(*b*) shows a rectangle notation for an object type 203, like "Sheet," and "Stack," together with a corresponding property type 204, like "size," "media type," and "height." FIG. 2(*c*) shows a diamond notation for an object type 206 in combination with a rectangle notation for an action type 205 in order to associate the object type 206 with the action type 205. FIG. 2(*d*) shows a diamond notation for an action type instance 207, an ellipse notation for an object type instance 208 and a rectangle notation for a parameter type instance 209, together forming a simple active phrase consisting of the action type instance 207, the object type instance 208 and the parameter type instance 209. An action type instance will also be called an action hereinafter. An object type instance will also be called an object hereinafter. A parameter type instance will also be called a parameter hereinafter. A property type instance will also be called a property hereinafter. A simple active phrase will also be called an action phrase hereinafter.

An action type defines how an invocation of an action causes a transition in the state of its associated objects on the basis of the parameters of the action. A transition may comprise a modification of a value of a property. A transition may comprise a creation or a termination of a relationship between objects. A transition may comprise a creation of a new object instance, or a destruction of an object instance.

If an object A is instantiated by an action on object B, the object A is said to be a direct descendant of object B, and object B is said to be the direct ancestor of object A. A descendant of an object A is any object that is a direct descendant of object A or a direct descendant of a descendant of object A.

The inventors have noticed that a large complex domain of document production devices may be described with a small set of action types and object types. By observing the behavior of a document production device while running, the appropriate actions and objects are captured as action phrases in natural language as shown in Table 1 shown hereinafter, with a verb representing the action type instance, with direct and indirect objects representing the object type instances and with a prepositional clauses representing parameter type instances. In Table 1 a single action phrase is observed for Device-1. In Table 1 a plurality of action phrases is observed for Device-2. Also, it is observed that one or more action phrases are repeated. Also, it is observed that one or more action phrases are optional. For other devices, a mutual exclusive selection among two or more action phrases may occur. For other devices, two or more action phrases may be executed in parallel.

TABLE 1

Observed Action Phrases

Device-1

You trim a stack of sheets, at a distance from an edge.

Device-2

Repeatedly,
  You separate a sheet from a stack in an input tray
  Optionally, you print an imposition on the sheet, at the front face
  Optionally, you print an imposition on the sheet, at the back face
  You gather the sheet on a stack in an output tray FIG. 3(*a*) shows a composition of action phrases for a printer module, for example the printer module 2 in FIG. 1. The composition comprises an input joint 301. The input joint 301 is capable of receiving a control token. The composition comprises a sequence association 302. The sequence association 302 forwards the control token to the entity 303 at its arrow head. The composition comprises an iteration coordinator 303. The iteration coordinator 303 receives a control token and emits it to its right as many times as it is set to do. Next, the iteration coordinator 303 emits the control token downwards. The composition comprises an action type instance 304. When the action type instance 304 receives a control token, it performs a transition on its associated object type instances, the transition being defined by the type of the action of the action type instance 304. Next, it emits the control token at its bottom. The composition comprises an output joint 305. The output joint 305 is capable of transferring a control token to an input joint that is connected to the output join.

Figure 3A:
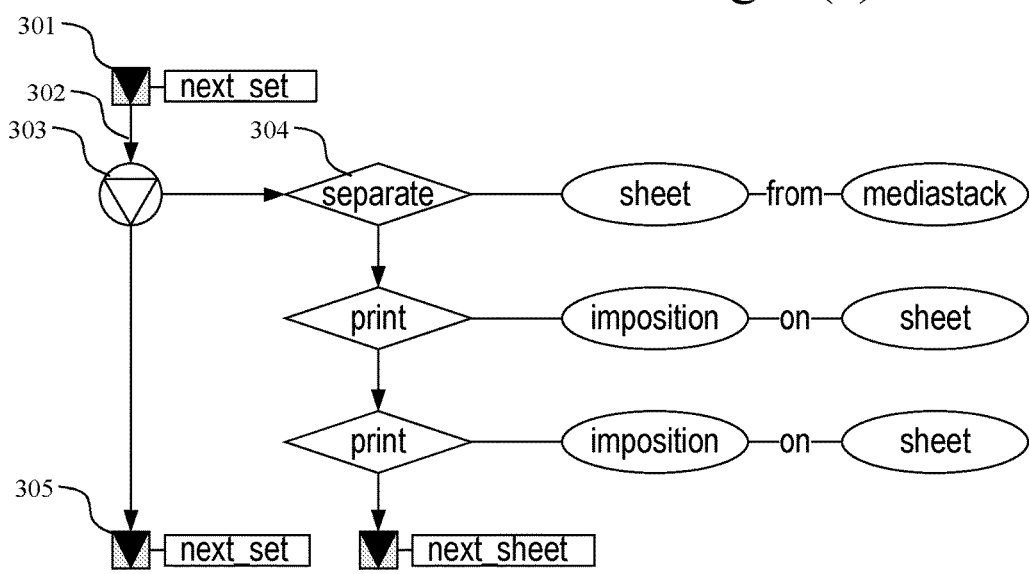
FIG. 3(a) shows a composition of action phrases according to the invention.
Figure 3B:
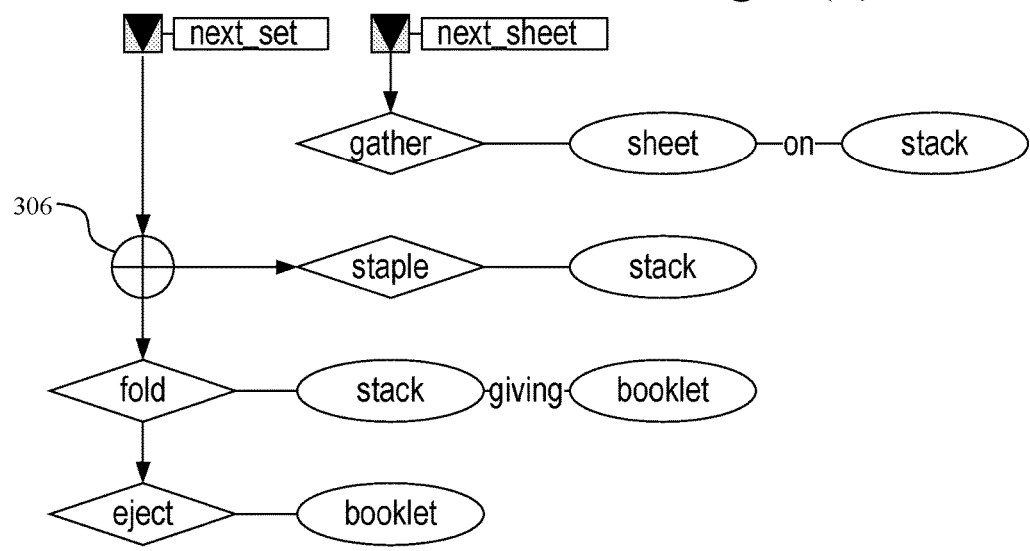
FIG. 3(b) shows another composition of action phrases according to the invention.

FIG. 3(b) shows a composition of action phrases for a finisher module, for example the finisher module 3 in FIG. 1. The composition comprises an option coordinator 306. The option coordinator 306 receives a control token and optionally emits the control token to the right if it is set to do so. Next it emits the control token at the bottom.

Figure 3C:
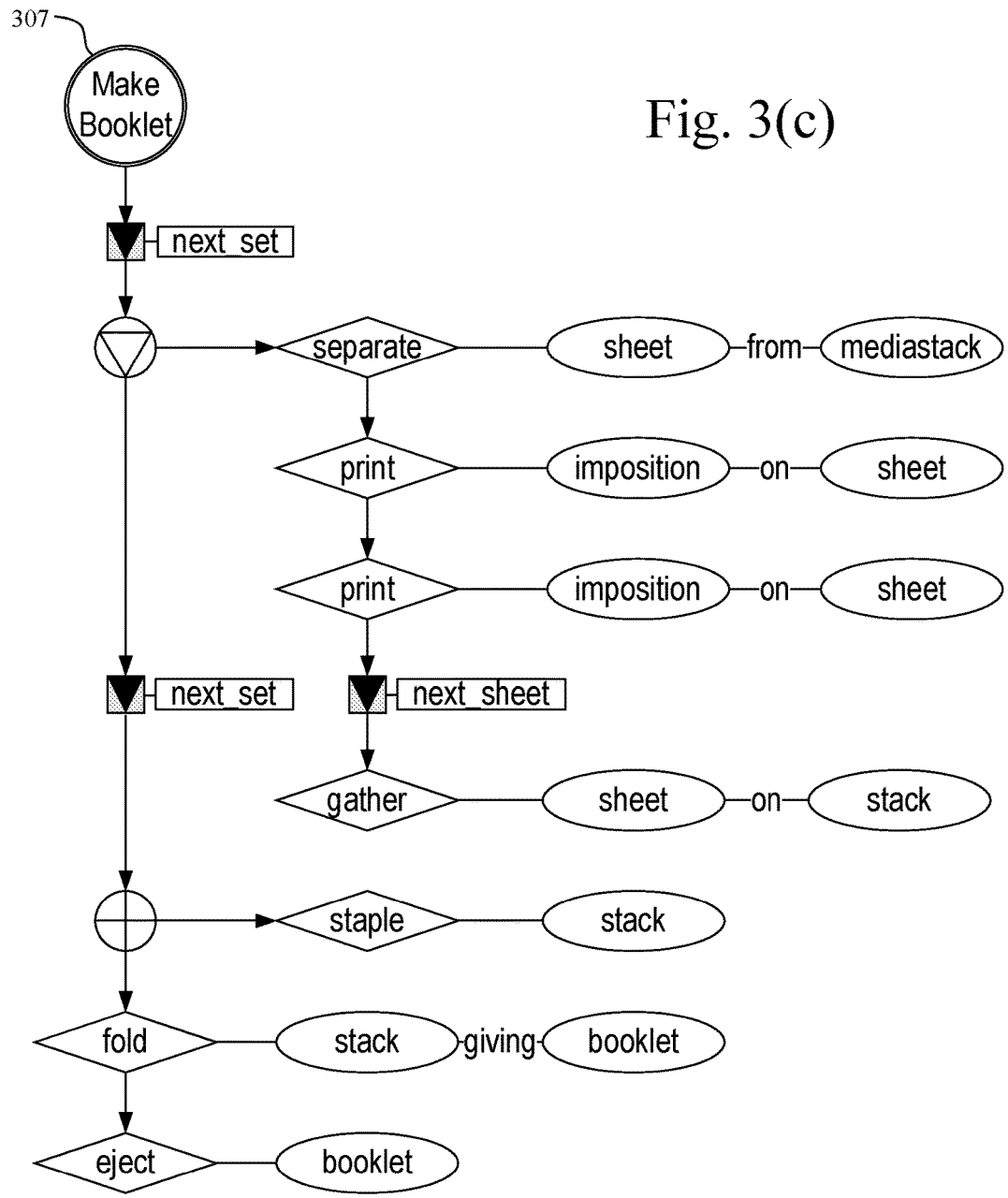
FIG. 3(c) is a function model created by joining according to the invention.

FIG. 3(c) shows a join of the composition of FIG. 3(a) and FIG. 3(b). Each of the compositions in FIG. 3(a) and FIG. 3(b) represents a device module that cannot execute, i.e. there is no entity that emits a control token initially. The join of modules in FIG. 3(c) represents a device that can execute. The join of compositions comprises a function controller 307 that is capable of emitting a control token initially if so triggered. A composition of action phrases—with or without joins—that includes a function controller will also be called a function model or a function hereinafter.

FIG. 4(a) shows a function controller 401 for the function model shown in FIG. 3(c). The function controller 401 receives a message 402. The message 402 comprises a plurality of settings. A setting is a value that is used to set coordinators in a function model. A setting may also be used to set a parameter of an action in a function model. The function controller 401 also receives a plurality of sheet objects 403 and a plurality of page objects 404. The objects 403, 404 that the function controller 401 receives are available to be associated with actions inside the function model. The function controller 401 also emits an object 405. The object 405 that the function controller 401 emits is only available as a result of the invocation of the actions inside the function model.

A function controller is capable of emitting a plurality of objects. A function controller is also able to emit a plurality of messages. The plurality of messages and objects a function controller needs to receive before it is able to emit a control token will also be called the function signature hereinafter. A function controller will emit a control token at its bottom when it has received the messages and the objects defined in the signature of the function.

FIG. 4(b) shows a function model for a trimming device.

FIG. 4(c) shows a function signature for the trimming device of FIG. 4(b).

FIG. 4(d) shows a concatenation of a function signature of a booklet printer 406 and a function signature of a trimmer 407. The concatenation is defined by a common booklet object 408 that is emitted by a booklet maker function controller and received by a trimmer function controller. A concatenation may also be defined by a common message between a function controller that emits the message and a function controller that receives the message. A concatenation may be extended to include any number of function controllers using any number of common objects and any number of common messages, thus forming a directed non-cyclical graph of function controllers, objects and messages. Such a graph will also be called a production route model or production model or route model hereinafter.

A production route model is valid if each action type used is included in an action vocabulary and if each object used is included in an object vocabulary. The action vocabulary is a list of valid action types. The object vocabulary is a list of valid object types.

A purpose of the production route model is to model a production route with details that are relevant for the operation of the devices in the route. Another purpose of the production route model is to model the end product with only details that are relevant for the document that is produced by the route, and ignoring the details that are not observable in the document produced. For example, a production route model may include a detail that is known as "same-up" where two identical copies of the document are printed on a single sheet, and where the single sheet is cut in half at a later stage in the production route. The "same-up" detail is relevant for the production route as the actions of printing and cutting must be consistent with each other in order to produce the document correctly, but the same-up detail is not relevant for the resulting document as it is not observable from the resulting document whether a "same-up" production route is used or not. A production route model that is created for the purpose of modelling the end product will be called a product model hereinafter.

In order to construct an imposition from the actions in the production route, four auxiliary actions may be defined: "ToBrowse," "ToAssert," "ToPaginate," and "ToPlace." These four auxiliary action types will be elucidated hereinafter.

Table 2 shows a production route for a booklet. The production route contains a production phase where the booklet is actually produced and an assertion phase where the booklet is appreciated by an observer. It is noted that the actions in the assertion phase do not modify the booklet in any way.

TABLE 2 booklet with assertion phase production phase
Repeatedly,
  You separate a sheet
  You print an imposition on the sheet, at the front face
  You print an imposition on the sheet, at the back face
  You gather the sheet on a stack
You fold the stack in half giving a booklet.
You trim the booklet, at three sides.
assertion phase
You browse the booklet, over the binding edge, leaf by leaf
For all leafs,
  You assert the content of the desired PDL page on the leaf
  at the front page,
  — at the desired position, orientation and scale.
  You assert the content of the desired PDL page on the leaf
  at the back page,
  — at the desired position, orientation and scale.

The action type "ToBrowse" captures the act of browsing or leafing through a document. The terms "browse" and "leaf" will be used interchangeably hereinafter. A physical entity which is turned over while browsing or leafing is called a leaf. A leaf is a sheet that serves a purpose of browsing or leafing. A leaf has two pages, a front page and a back page. A page is to a leaf what a face is to a sheet.

While browsing or leafing a physical end product, when done reading a previous page, a leaf is turned over in order to continue reading a next page. A turning edge is an edge which is turned over in order to see content on the next page in the same orientation as content on the previous page. The turning edge may be a left edge, a top edge, a right edge or a bottom edge of the sheet. The turning edge may be the same for all leafs in a physical end product. The turning edge may be the same edge as a binding edge. The binding edge is an edge where the sheets comprised in the physical end product are bound together.

The action type "ToAssert" captures the act of observing the properties of an object and assessing if the properties of the object comply with the parameters of at least one assertion. In the example hereinafter, it is assumed that an imposition has already been created. If the imposition has been created correctly, then the at least one assertion will be true. The at least one assertion will be true if the imposition correctly anticipates actions like folding, trimming and browsing and also correctly anticipates desires about the placement of content on a page. An anticipation may comprise one or more matrix transformations.

For example, the action type "ToTrim" requires the content to be shifted away from an edge where a part of the sheet will be trimmed off. An anticipation may comprise content clipping. For example, the action type "ToFold" requires the content on one page not to extend across the fold line onto another page. An anticipation may comprise a creep compensation. An anticipation may comprise a reading order and a binding edge. It is noted that an anticipation may comprise an accumulation of an impact of every action that is executed between the action "ToPrint" and the action "ToAssert." It is noted that the impact of each action can be described independently of any other action in the production route model.

Table 3 is shown below in order to introduce the other two auxiliary action types "ToPaginate" and "ToPlace."

TABLE 3 booklet - with assignment phase

```
production phase
Repeatedly,
   You separate a sheet
   You print an imposition on the sheet, at the front face
   You print an imposition on the sheet, at the back face
   You gather the sheet on a stack
You fold the stack in half giving a booklet.
You trim the booklet, at three sides.
assignment phase
You paginate the booklet, over the binding edge, leaf by leaf
For all leafs,
   You place the content of the desired PDL page on the leaf
   at the front page,
      — at the desired position, orientation and scale.
   You place the content of the desired PDL page on the leaf
   at the back page,
      — at the desired position, orientation and scale.
```

Table 3 shows a production route model derived from Table 2 by replacing "ToBrowse" with "ToPaginate," and replacing "ToAssert" with "ToPlace." Thus, the assertion phase in Table 2 where pages and content were observed is replaced by an assignment phase in Table 3 where pages and content are assigned. In Table 3, it is assumed that the imposition has not yet been created and therefore it will print nothing. The action type "ToPaginate" captures the act of defining leafs and pages while leafing through the booklet. The action type "ToPlace" captures the act of placing content on a desired page and at a desired scale, orientation and position, etc. The production route model may contain actions to be executed after "ToPlace." Actions executed after "ToPlace" affect the physical end product, but they do not affect the placement of content on the pages.

In reality, the action type "ToPlace" may be difficult to perform. It may be impractical to implement a production device that is capable of placing content on a page after the sheets have been folded and trimmed. However, in a simulation step by a simulation module according to the invention this can be done without problem. This simulation step according to the invention enables the computation of the imposition as is shown in FIG. 5.

Figure 5:
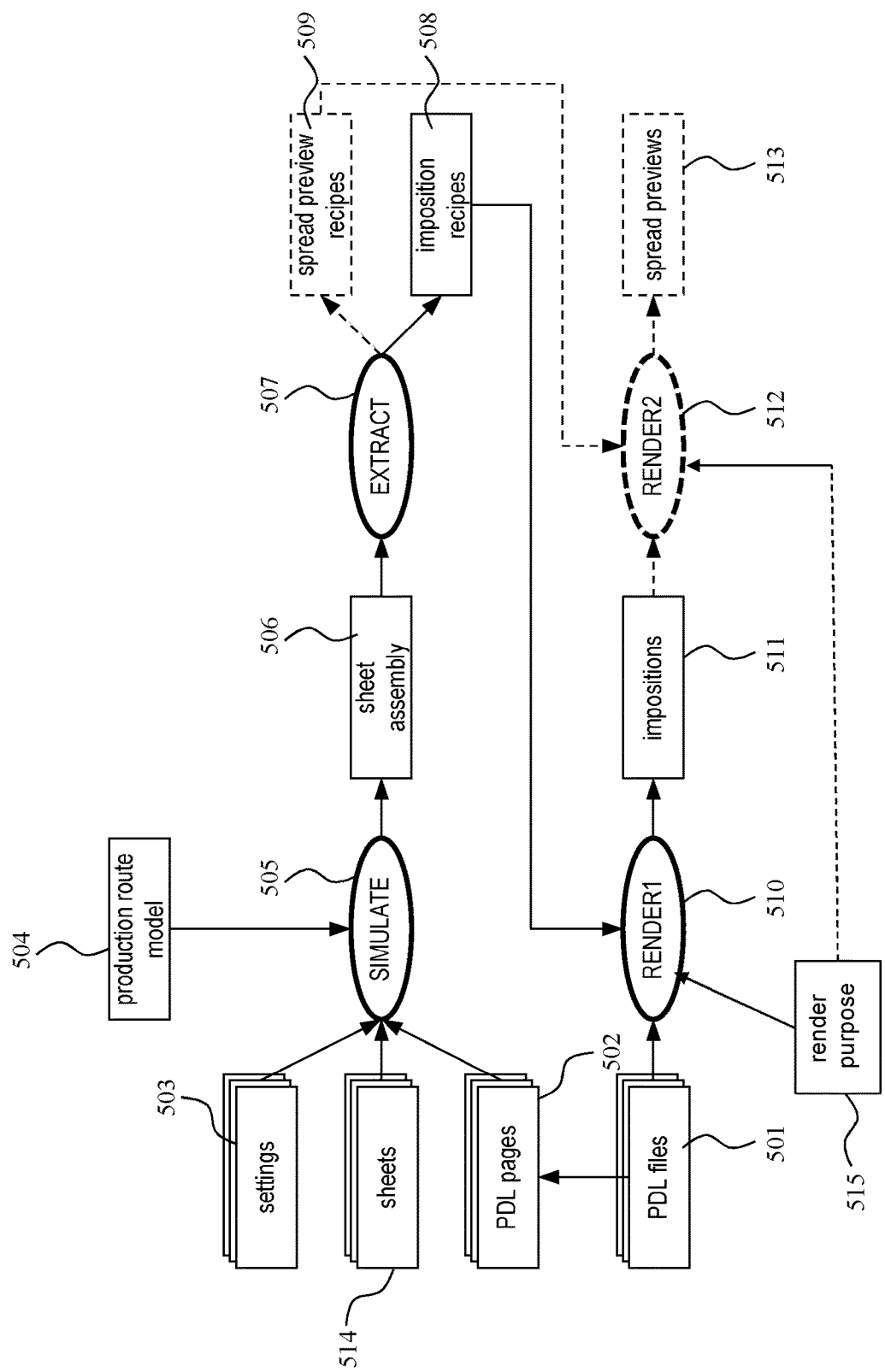
FIG. 5 is an architecture diagram of the method according to the invention.

FIG. 5 shows an architecture diagram of an embodiment of the method of the invention. The embodiment comprises three processing steps: a simulation step 505, an extraction step 507, and an imposition rendition step 510. Indicated by dashed lines, in a further embodiment an additional step, a preview rendition step 512, is implemented.

The simulation step 505 may be executed by the simulation module of the document processing system according to FIG. 1. The extraction step 507 may be executed by the extraction module of the document processing system according to FIG. 1. The imposition rendition step 510 may be executed by the rendition module of the document processing system according to FIG. 1. A part of the simulation step 505 may be executed by the extraction module or by the imposition rendition module. A part of the extraction step may be executed by the imposition rendition module.

The device simulation step 505 takes as input one or more collections of settings 503, and one or more sequences of page objects 502 and one or more sequences of media 514. A setting is an input value provided by an operator, an input value included in a print job ticket of the document to be processed, which print job ticket is submitted to the document processing system via a network. A PDL page is an object representing a page in a PDL file 501 (PDL is the well-known abbreviation of Page Description Language). A PDL page object comprises a content property representing the content to be rendered on behalf of the page in the PDL file. A PDL page object comprises a boxes property representing one or more boxes that determine the placement of the content on a page. A source of input settings may be a user interface—a local user interface and/or a remote user interface. The user interface may be a graphical user interface. A source of input settings may be a Management Information System (MIS). A format of input settings may be a job definition format also known as a JDF format. A source of pages may be a prepress system. A source of pages may be a printer driver. A format of the pages may be a portable document format (PDF). The format of the pages may be any other PDL format that allows page boxes to be extracted from the format.

The simulation step 505 also takes as input a production route model 504 as shown in FIG. 4(d). The simulation step 505 executes the route model, taking the input settings and the input page boxes as input, and producing the sheet assembly 506 as output. The sheet assembly is a record of transitions that result from an invocation of actions.

An extraction step 507 takes as input the sheet assembly. The extraction step produces an imposition recipe 508 as output. The imposition recipe may comprise a set of sheet imposition recipes, wherein each sheet imposition recipe comprises a subset of the transitions from the sheet assembly in such a way that the subset may be rendered conveniently in the imposition rendition step 510. The extraction step 507 produces the imposition recipe by traversing the sheet assembly and extracting relevant information. The extraction step 507 may also produce spread preview recipes 509 as output. A spread preview recipe comprises a set of spread descriptions. Each spread description comprises a subset of the transactions and transitions from the sheet assembly in such a way that the subset may be rendered conveniently in a second rendition step 512. The extraction step 507 produces the spread preview recipe by traversing the sheet assembly and extracting relevant information.

The imposition rendition step 510 takes as input the imposition recipe 508. The imposition rendition step 510 also takes as input the actual pages from the input document(s) 501. The imposition rendition step 510 also takes as input a render purpose. The imposition rendition 510 step renders the imposition descriptions in the imposition recipe 508 into impositions 511 on a render medium in a target format. The render medium may have a PDL format for subsequent printing. A form of the PDL format to render into is a PDF format. The render medium may be an image format for subsequent viewing. A form of the image format to render into is a TIFF format or a PNG format. The render medium may be a printer bitmap from which the imposition is printed. The render medium may be HTML5 <canvas> from which the imposition is viewed.

The second rendition step 512 takes as input the spread preview recipes 509. The second rendition step 512 also takes as input the impositions 511 and the render purpose 515. The second rendition step 512 renders the spread descriptions in the spread recipe into spreads 513 onto the render medium in a target format. The second rendition step 512 may be executed by a second rendition module. The second rendition step 512 may also be executed by the same rendition module that renders the imposition recipe in the first rendition step 510.

The method of the invention shown in FIG. 5 may also be applied to pre-processed media. According to an embodiment, a pre-processed medium is represented as an object that has an action history comprising at least one pre-process action. The at least one pre-process action in the action history will be included in the sheet assembly by the simulation module.

For example, a pre-printed medium may be represented as an object that has a transaction history attached to it comprising the action "ToPrint." A pre-punched medium may be represented as an object that has a transaction history attached to it comprising the action "ToPunch." A pre-perforated medium may be represented as an object that has a transaction history attached to it comprising the action "ToPerforate."

In terms of FIG. 5, the sheets 514 that are received by the simulate step 505 may contain an action history. The actions in this history will be named pre-actions hereinafter. The simulate step 505 will include the pre-actions in the sheet assembly as if they happened in the simulation itself. The extract step 507 will process the pre-actions in the same way as the actions. The extract step 507 will also keep a flag to mark the distinction between pre-action and action. The first rendition step 510 will not render the pre-action for the render purpose production. The first rendition step 510 will render the pre-actions for the render purpose preview. The second rendition step 512 will render the pre-action in the same way as the actions. Thus, the spread previews 513 will show the pre-actions as well as the actions. By doing so, Pre-printed media is described in an action based manner.

Figure 6:
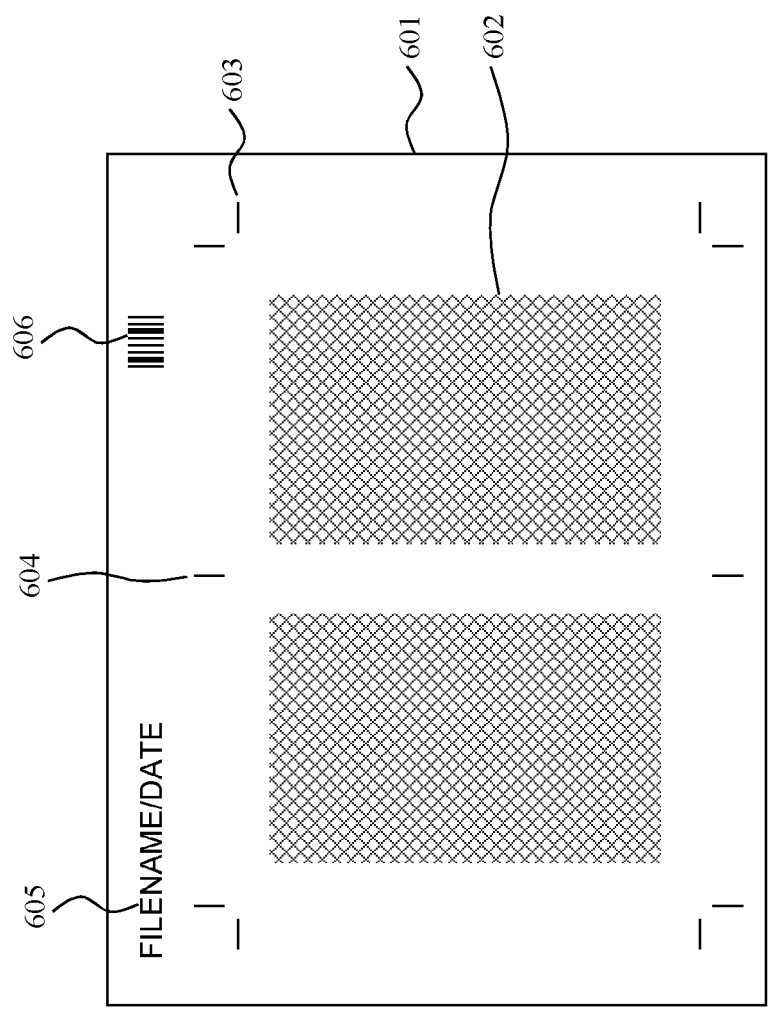
FIG. 6 shows an imposition according to the invention.

FIG. 6 shows an imposition 601 according to the invention. The imposition 601 contains content from the PDL page 602 and appropriate action marks like a trim mark 603 and a fold mark 604. The imposition 601 may contain an identification 605, like a filename in combination with a date of creation, and an instruction 606, like a bar code. Generally, an imposition according to the invention at least contains content from a PDL page and appropriate action marks.

Figure 7:
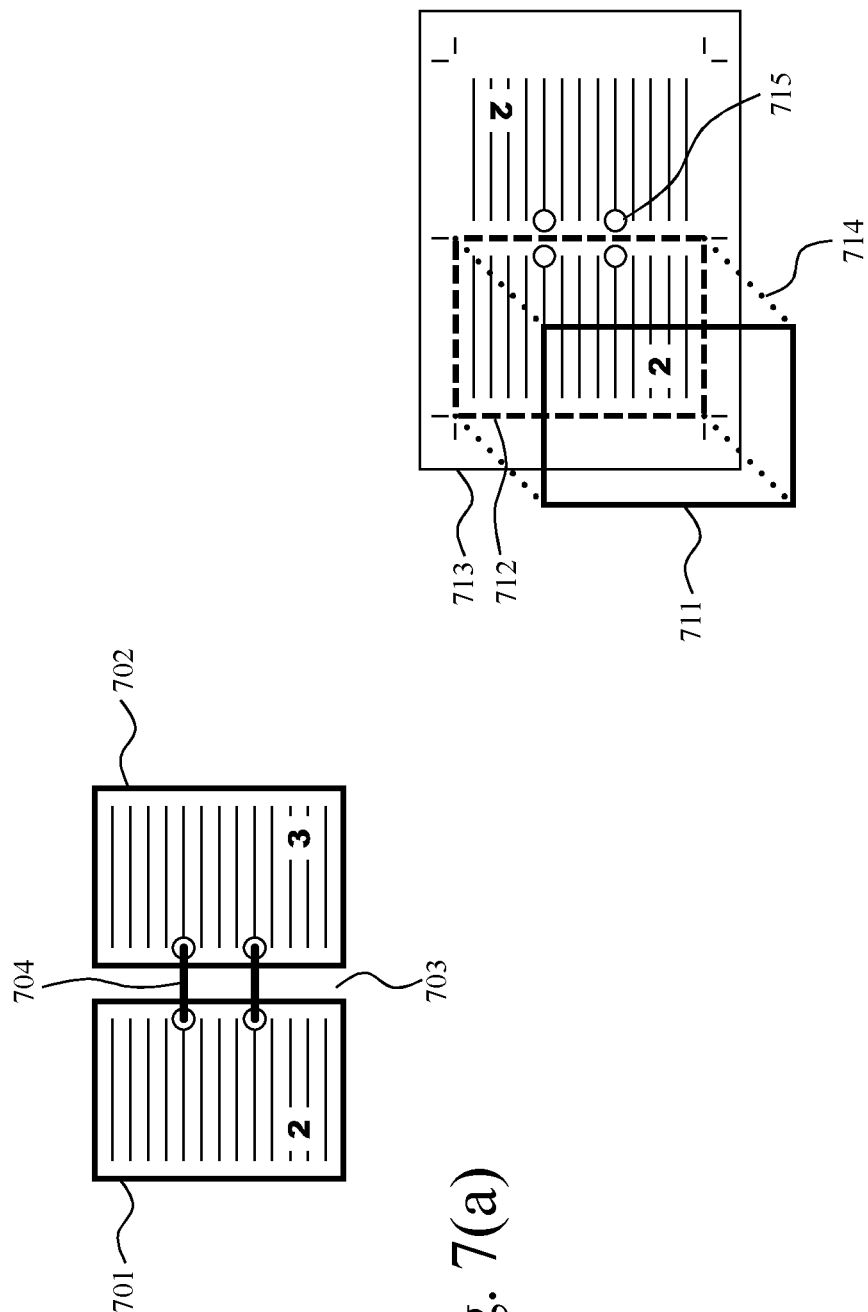
FIG. 7(a) shows a spread preview according to the invention.
FIG. 7(b) shows a page view according to the invention.

FIG. 7(*a*) shows a spread preview according to the invention. A spread preview may contain a first page view 701 for the back page of the spread, and may contain a second page view 702 for the front page of the spread. The page views may be set apart by a gutter 703 visualizing the distance between the two pages of a spread of the physical end product. A spread preview may contain binding adornments 704 visualizing binding artefacts of the physical end product.

FIG. 7(*b*) shows a page view according to the invention. The page view comprises a viewport 711, a window 712, and a view transformation 714. The viewport 711 is an area on the render medium where the window 712 is going to be rendered in. The window 712 is an area of interest of an imposition 713 that is to be viewed in the viewport 711. The view transformation 714 is a matrix transformation mapping coordinates of the window 712 to coordinates of the viewport 711. It is noted that for the render purpose of being viewed in a spread preview, the rendition of an imposition 713 may include additional action marks like punch holes 715.

Figure 8:
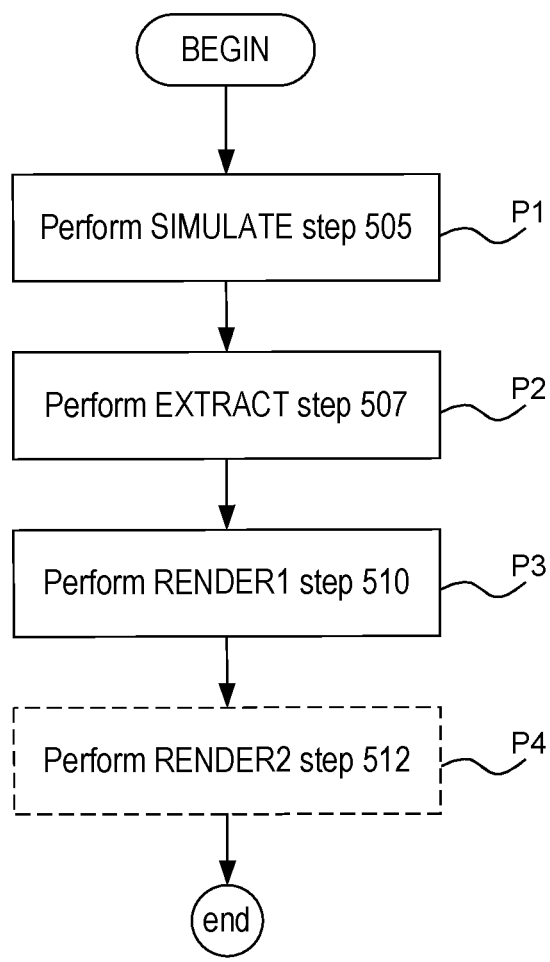
FIG. 8 is a flowchart illustrating an embodiment of the method according to the invention.

FIG. 8 is a diagram of an embodiment of the method according to the invention. The method executes in sequential order a simulating step P1, an extracting step P2, a first rendition step P3 and optionally a second rendition step P4. The simulating step P1, the extracting step P2, the first rendition step P3 and the second rendition step P4 correspond to the steps 505, 507, 510 and 512 in FIG. 5, respectively.

Alternatively, the extracting step P2 and the first rendition step P3 may be combined into one step. Alternatively, the first rendition step P3 and the second rendition step P4 may be combined into one step. Alternatively, the extracting step P2, the first rendition step P3 and the second rendition step P4 may be combined into one step. The combination of the steps may be established by combining software and/or hardware applications designed for executing the steps.

Figure 9:
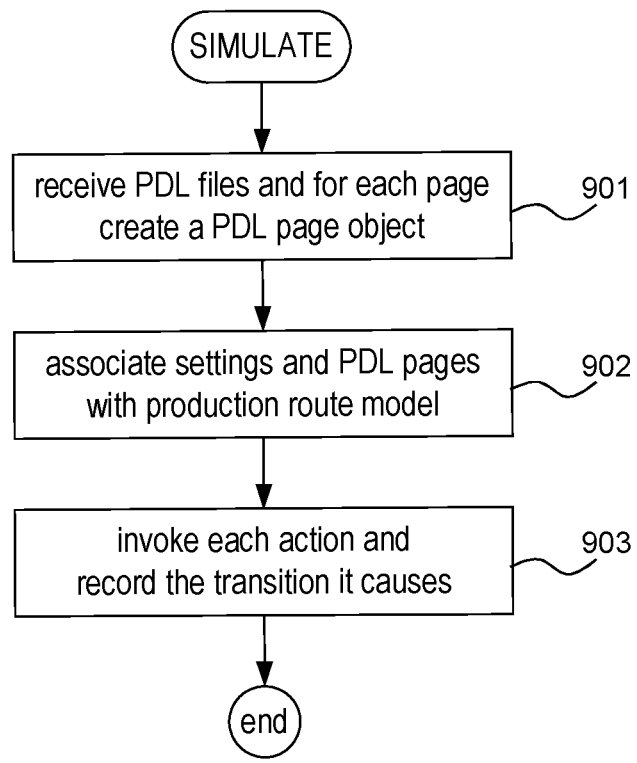
FIG. 9 is a flowchart illustrating an embodiment of the simulating step of the method according to the invention.

FIG. 9 elucidates the simulation step P1 of FIG. 8. Reference numerals introduced in FIG. 5 will be used in the description of FIG. 9. In a first step 901, a PDL file and a representation of pages in the PDL file as objects 502 of type PDL page shown in FIG. 5 are received. A property of the object type PDL page is at least one page box. A page box may be a media box, a clip box, a bleed box, a trim box, an art box, etc. These boxes are defined as page boxes for PDF and introduced in Adobe Systems. Another property of the object type PDL page is the content of the page in the PDL file, either by copy or by reference.

In a second step 902, page objects 502 are associated with the production route model 504, messages 503 are associated with the production route model 504, and sheets 514 are associated with the production model 504. When the association of pages, messages and sheets satisfies the function signature of any function controller in the production route model, this function controller will trigger and begin execution of its function model.

In a third step 903, each action is invoked, a transition is computed caused by the invocation, the transition is recorded in the sheet assembly and the transaction is recorded in a sheet assembly history. A transaction is a record of an action invocation with its parameters and associated objects. The sheet assembly history is a list of transactions that have been recorded.

Figure 10A:
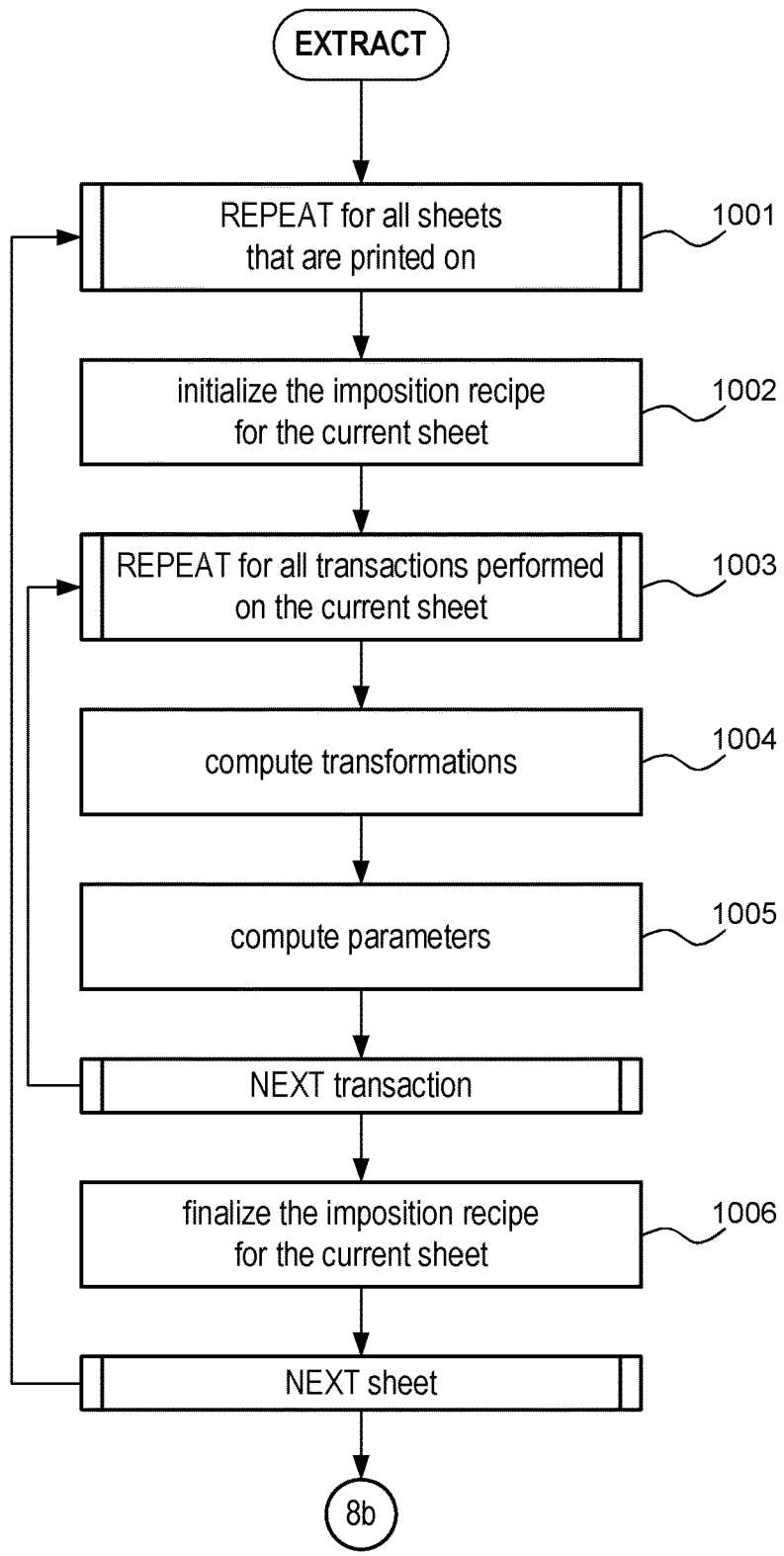
FIGS. 10(a) and 10(b) are flowcharts showing an embodiment of the extracting step of the method according to the invention.

FIG. 10(*a*) elucidates the extracting step P2 of FIG. 8 wherein an imposition recipe is created. The sheet assembly history is traversed.

In a first step 1001, transactions that are a printing transaction are found. A printing transaction is a transaction that contains—for example—the phrase "to print an imposition on a sheet." Sheets contained in the printing transactions are found.

In a second step 1002, for each found sheet, a sheet imposition recipe is created.

In a third step 1003, for each found sheet, transactions that acted on this sheet after the printing transaction, and transactions that acted on descendants of this sheet are found. For each transaction that is found, the transaction is appended to the imposition recipe for the sheet.

A fourth step 1004 and a fifth step 1005 are repeated for each found transaction.

In the fourth step 1004, for each transaction appended to the imposition recipe for the sheet, a transformation matrix is computed for each object associated with the action contained in the transaction. The transformation matrix expresses the change in coordinate system of the associated object caused by the action. If the object was instantiated by the action, the transformation matrix is taken relative to the coordinate system of the direct ancestor of the object.

Each action type in the action vocabulary provides instructions for a computation of this transformation matrix. The computation may depend on parameters of the action.

In the fifth step 1005, parameters are computed related to the appended transaction.

For example, action type "ToTrim" may translate the coordinate system of the sheet that is associated with the action with an amount that depends on the parameters of the action. For example, a transaction with an action type "ToCut" may instantiate two new sheets: a first sheet has a translation of [0,0] relative to its ancestor, a second sheet has a translation relative to its ancestor that reflects the parameters of the action.

For each appended transaction, the parameters of the action contained in the transaction are extended. The extension expresses a position of action marks to be rendered in the rendition step(s) shown in FIG. 5.

Each action type in the action vocabulary provides instructions for the computation of the parameter extension. The computation of parameter extension may depend on the parameters of the action and it may depend on an inspection of the sheet assembly history. For example, a transaction with action type "ToTrim" wants to render trim marks on a line defined by a distance parameter of the action, at a position that depends on a size of the sheet after the trimming actions have been performed. In order to compute these positions, a last transaction on a list of transactions for this sheet is found, the size of the sheet after that transaction is retrieved, and the retrieved size is used to compute the positions of the trim marks.

In a sixth step 1006, the imposition recipe for the sheet is finalized. The list of appended transactions is comprised in the imposition recipe for a sheet.

At last, the sheet imposition recipes are gathered in a collection to form the document imposition recipe.

In an alternative embodiment, the fourth step 1004 of computing the transformation matrix for a transaction is performed during the simulation step P1 in FIG. 8 or during the first rendition step P3 in FIG. 8. In an alternative embodiment, the fifth step 1005 of computing the parameter extensions for a transaction is performed during the rendition step P3 in FIG. 8.

In fact, any computation implied in FIG. 5 may be performed in any step in FIG. 5, as long as the inputs for the computation are already available as received inputs or as outcomes of previous computations.

Alternatively, any number of consecutive steps in FIG. 5 may be combined into one step.

The following Tables 4, 5, and 6 further elucidate the extraction step of FIG. 10 (*a*). The Tables 4, 5, and 6 show respectively a first example for a LooseLeaf product, a second example for a LooseLeaf product with Cut and Stack, and a third example for a Booklet.

TABLE 4

LooseLeaf

Production Model

Repeatedly, for two sheets
   You separate a sheet from a stack in an input tray
   You print an imposition on the sheet, at the front face
   You print an imposition on the sheet, at the back face
   You gather the sheet on a document stack
Repeatedly, for all sheets in the document stack
   You paginate the sheet, giving a leaf
   You place a pdl-page on the leaf at the front page
   You place a pdl-page on the leaf at the back page Sheet Assembly History You separated sheet01 from a stack in an input tray.
You printed imposition01 on sheet01, at the front face.
You printed imposition02 on sheet01, at the back face.
You gathered sheet01 on the document stack
You separated sheet02 from a stack in an input tray.
You printed imposition03 on sheet02, at the front face.
You printed imposition04 on sheet02, at the back face.
You gathered sheet02 on the document stack You paginated sheet01, giving leaf01.
You placed pdl-page01 on leaf01, at the front page.
You placed pdl-page02 on leaf01, at the back page.
You paginated sheet02, giving leaf02.
You placed pdl-page03 on leaf02, at the front page.
You placed pdl-page04 on leaf02, at the back page.

History for Sheet01

You separated sheet01 from a stack in an input tray.
You printed imposition01 on sheet01, at the front face.
You printed imposition02 on sheet01, at the back face.
You gathered sheet01 on the document stack
You paginated sheet01, giving leaf01.
You placed pdl-page01 on leaf01, at the front page.
You placed pdl-page02 on leaf01, at the back page.

Imposition Recipe for Sheet01

The sheet01 has been
   Separated from a stack
   Printed on with Imposition01
   Gathered on the document stack
   Paginated giving leaf01
The leaf01 has been
   Placed on with pdl-page01, at the front face
   Placed on with pdl-page02, at the back face

TABLE 5

LooseLeaf with Cut & Stack

Production Model

Repeatedly, for two sheets
   You separate a sheet from a stack in an input tray
   You print an imposition on the sheet, at the front face
   You print an imposition on the sheet, at the back face
   You gather the sheet on an intermediate stack You cut the sheets in the intermediate stack in half giving
a stack of left-sheets and a stack of right-sheets.

TABLE 5-continued

LooseLeaf with Cut & Stack

You stack the right-sheets on the left-sheets, giving the
document stack.

Repeatedly, for all sheets in the document stack
    You paginate the sheet, giving a leaf
    You place a pdl-page on the leaf at the front page
    You place a pdl-page on the leaf at the back page

Sheet Assembly History

You separated sheet01 from a stack in an input tray.
You printed imposition01 on sheet01, at the front face.
You printed imposition02 on sheet01, at the back face.
You gathered sheet01 on the intermediate stack
You separated sheet02 from a stack in an input tray.
You printed imposition03 on sheet02, at the front face.
You printed imposition04 on sheet02, at the back face.
You gathered sheet02 on the intermediate stack You cut the sheets in the intermediate stack in half giving
a stack of left-sheets and a stack of right-sheets.
You stack the right sheets on the left sheets, giving the
document stack You paginated right-sheet02, giving leaf01.
You placed pdl-page01 on leaf01, at the front page.
You placed pdl-page02 on leaf01, at the back page.
You paginated right-sheet01, giving leaf02.
You placed pdl-page03 on leaf02, at the front page.
You placed pdl-page04 on leaf02, at the back page.
You paginated left-sheet02, giving leaf03.
You placed pdl-page05 on leaf01, at the front page.
You placed pdl-page06 on leaf01, at the back page.
You paginated left-sheet01, giving leaf04.
You placed pdl-page07 on leaf04, at the front page.
You placed pdl-page08 on leaf04, at the back page.

History for Sheet01

You separated sheet01 from a stack in an input tray.
You printed imposition01 on sheet01, at the front face.
You printed imposition02 on sheet01, at the back face.
You gathered sheet01 on the intermediate stack You cut sheet01 in half giving left-sheet01 and right-sheet01.
You stack the right-sheet01 on the left-sheet01.

You paginated right-sheet01, giving leaf02.
You placed pdl-page03 on leaf02, at the front page.
You placed pdl-page04 on leaf02, at the back page.
You paginated left-sheet01, giving leaf04.
You placed pdl-page07 on leaf04, at the front page.
You placed pdl-page08 on leaf04, at the back page.

Imposition Recipe for Sheet01

The sheet01 has been
    Separated from a stack
    Printed on with Imposition01
    Gathered on the intermediate stack
    Cut into left-sheet01 and right-sheet01
The right-sheet01 has been
    Paginated giving leaf02
The leaf02 has been
    Placed on with pdl-page03, at the front page
    Placed on with pdl-page04, at the back page
The left-sheet01 has been
    Paginated giving leaf04
The leaf04 has been
    Placed on with pdl-page07, at the front page
    Placed on with pdl-page08, at the back page

TABLE 6

Booklet

Production Model

Repeatedly, for two sheets
    You separate a sheet from a stack in an input tray
    You print an imposition on the sheet, at the front face
    You print an imposition on the sheet, at the back face
    You gather the sheet on an intermediate stack You fold the sheets in the intermediate stack in half left
over right, giving a document stack Repeatedly, for all sheets in the document stack
    You paginate the sheet, giving a leaf
    You place a pdl-page on the leaf at the front page
    You place a pdl-page on the leaf at the back page

Sheet Assembly History

You separated sheet01 from a stack in an input tray.
You printed imposition01 on sheet01, at the front face.
You printed imposition02 on sheet01, at the back face.
You gathered sheet01 on the intermediate stack
You separated sheet02 from a stack in an input tray.
You printed imposition03 on sheet02, at the front face.
You printed imposition04 on sheet02, at the back face.
You gathered sheet02 on the intermediate stack.

You fold the sheets in the intermediate stack in half; left
over right, giving a document stack.

You paginated left-sheet01, giving leaf01.
You placed pdl-page01 on leaf01, at the front page.
You placed pdl-page02 on leaf01, at the back page.
You paginated left-sheet02, giving leaf02.
You placed pdl-page03 on leaft22, at the front page.
You placed pdl-page04 on leaf02, at the back page.
You paginated right-sheet02, giving leaf03.
You placed pdl-page05 on leaf01, at the front page.
You placed pdl-page06 on leaf01, at the back page.
You paginated right-sheet01, giving leaf04.
You placed pdl-page07 on leaf04, at the front page.
You placed pdl-page08 on leaf04, at the back page.

History for Sheet01

You separated sheet01 from a stack in an input tray.
You printed imposition01 on sheet01, at the front face.
You printed imposition02 on sheet01, at the back face.
You gathered sheet01 on the intermediate stack.

You fold sheet01 in half giving left-sheet01 and right-sheet01,
where left-sheet01 is flipped You paginated left-sheet01, giving leaf01.
You placed pdl-page01 on leaf01, at the front page.
You placed pdl-page02 on leaf01, at the back page.
You paginated right-sheet01, giving leaf04.
You placed pdl-page07 on leaf04, at the front page.
You placed pdl-page08 on leaf04, at the back page.

Imposition Recipe for Sheet01

Figure 10B:
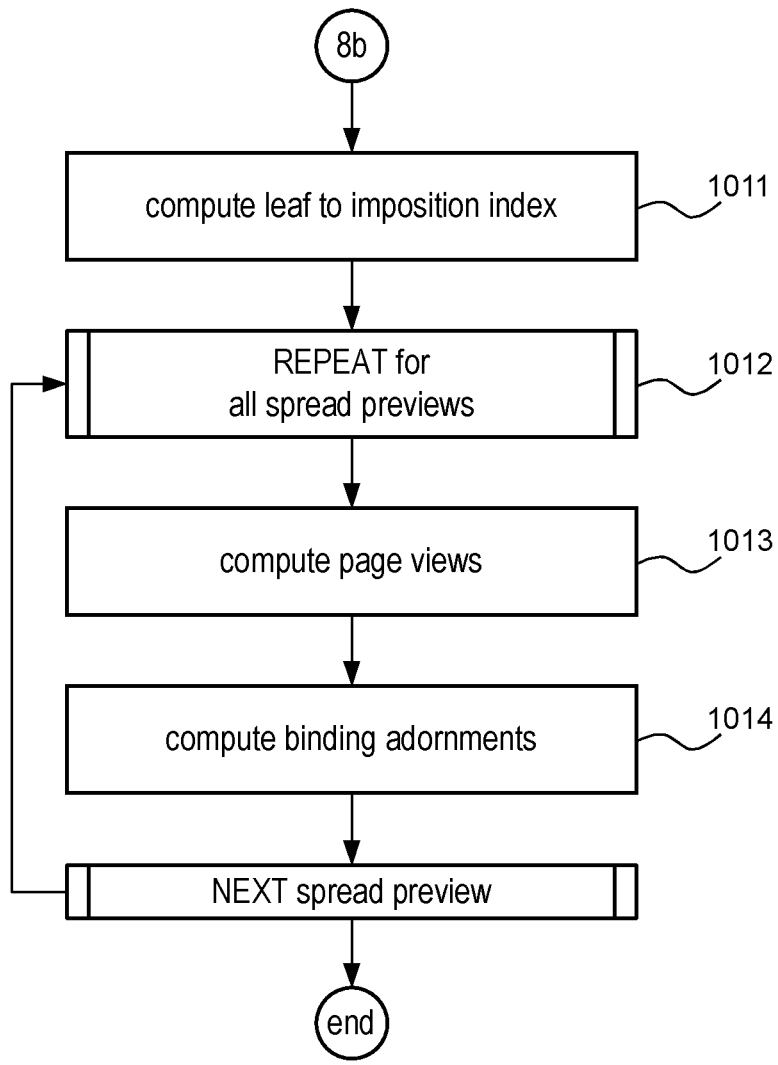

The sheet01 has been
    Separated from a stack
    Printed on with Imposition01
    Gathered on the intermediate stack
    Folded in half into left-sheet01 and right-sheet01, left over right
The left-sheet01 has been
    Paginated giving leaf01
The leaf01 has been
    Placed on with pdl-page02, at the front page
    Placed on with pdl-page02, at the back page
The right-sheet01 has been
    Paginated giving leaf04
The leaf04 has been
    Placed on with pdl-page07, at the front page
    Placed on with pdl-page08, at the back page FIG. 10(b) elucidates an optional part of the second step P2 of FIG. 8 wherein the spread preview recipes are created. Start point 8b leads to a first step 1011. In the first step 1011, a leaf to imposition index is created. The imposition recipe is traversed. All leafs are found. For each found leaf it is recorded in the leaf to imposition index on which imposition the leaf was found. It is also recorded what position and orientation the leaf has relative to the imposition. The leaf to imposition index is included in the list of spread preview recipes.

In a second step 1012 the spread preview recipes are created in a loop over the spread previews comprising a third step 1013 and a fourth step 1014. The number of leafs in the leaf to imposition index is counted. The number of spread recipes is the number of leafs plus one.

In the third step 1013, the pages are computed for each spread preview recipe. A first spread preview recipe contains a front page of a first leaf of the physical end product. A last spread preview recipe contains a back page of a last leaf of the physical end product. Any spread preview recipe between the first spread preview and the last spread preview contains a back page of a leaf numbered N and a front page of a leaf numbered N+1. The leaf numbers N and N+1 refer to the index of the leaf in the leaf to imposition index.

In the fourth step 1014, the binding transactions are extracted for each spread preview recipe. The sheet assembly is traversed. Each transaction that acts on a stack that represents the physical end product is appended to the spread preview recipe.

After a spread preview recipe has been created, a next spread preview recipe is created. After the last spread preview recipe has been enumerated, the spread preview recipes are complete. The optional part shown in FIG. 10(*b*) ends in an endpoint "end."

Figure 11A:
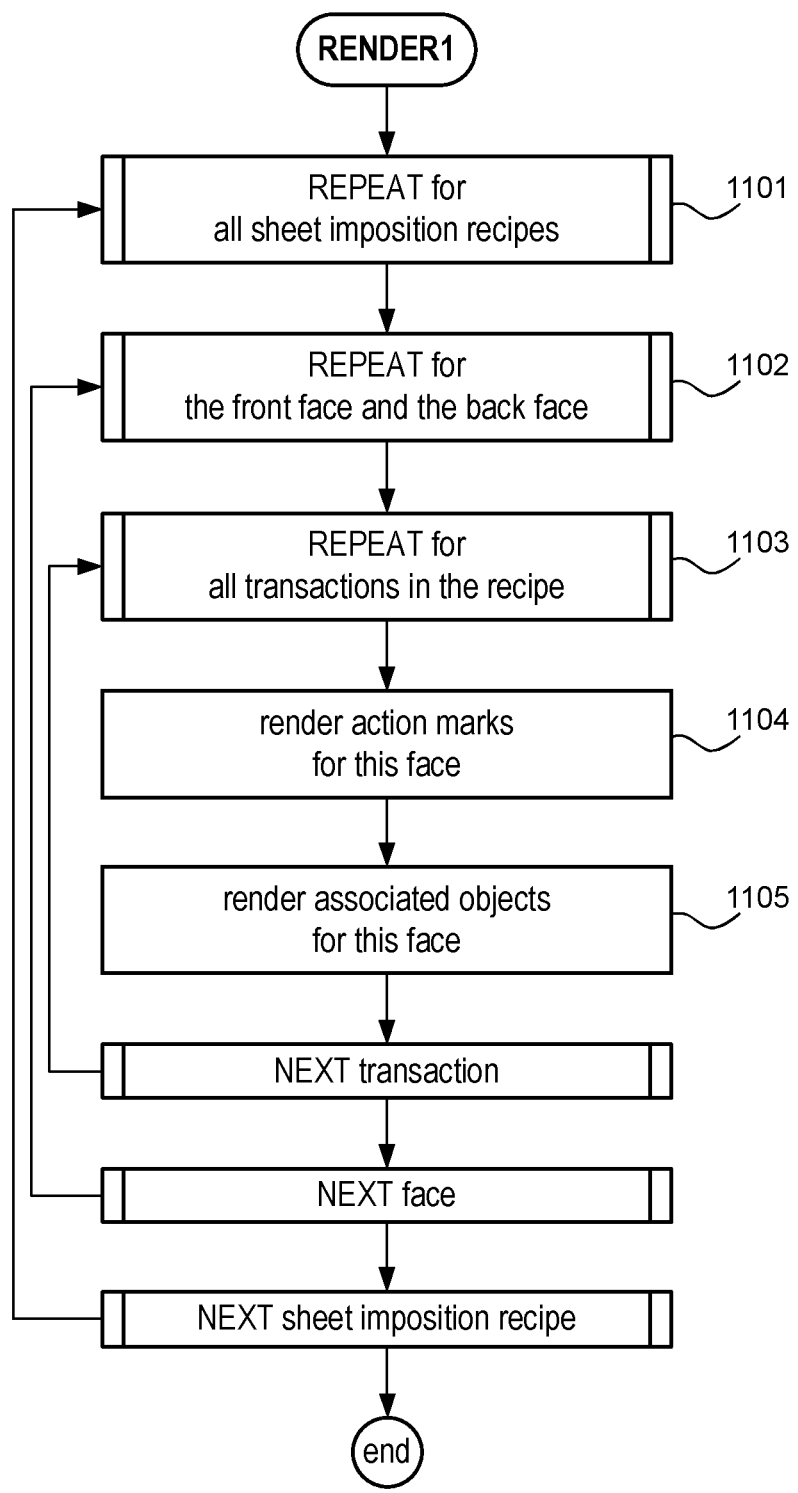
FIGS. 11(a) and 11(b) are flowcharts showing an embodiment of the rendering step of the method according to the invention in order to generate an imposition.
Figure 11B:
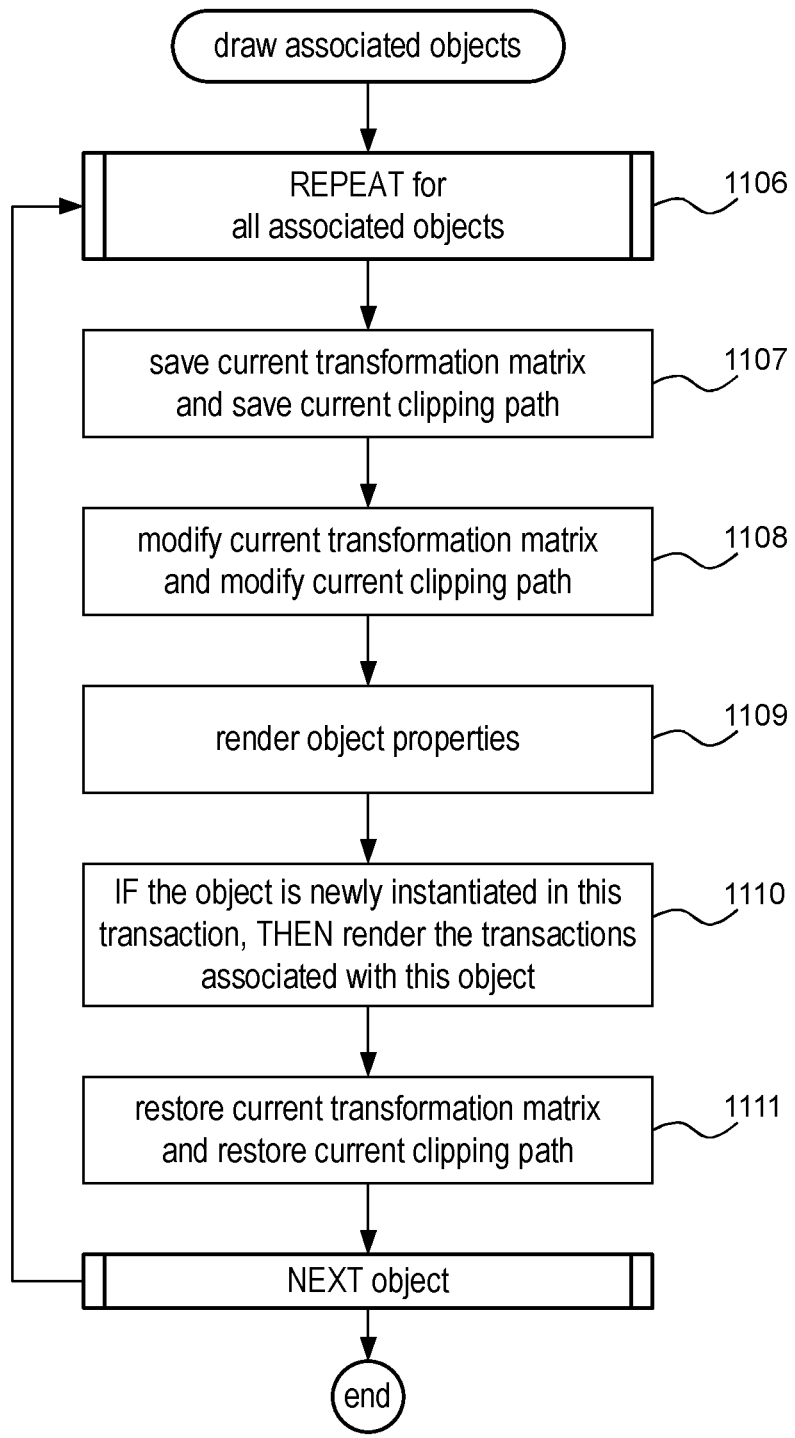

FIGS. 11(*a*)-11(*b*) elucidate the rendition step P3 of FIG. 8.

FIG. 11(*a*) shows steps to render the document imposition recipe.

A first step 1101 introduces a first loop over the sheet imposition recipes.

A second step 1102 introduces a second loop over the front face and the back face of each sheet imposition recipe. Each sheet imposition recipe is rendered twice, one for the front face and one for the back face. The second loop is enclosed in the first loop.

A third step 1103 introduces a third loop over the transactions in the sheet imposition recipe. The third loop is enclosed in the second loop.

In order to render a sheet imposition recipe for a face, the list of transactions contained in it is visited in the third loop. Each transaction is rendered on the render medium.

The rendering of a transaction onto the render medium comprises the following steps.

A fourth step 1104 is a rendition of action marks. Each action type in the action vocabulary provides instructions for rendering marks onto the render medium. The rendition of marks may depend on the values of the parameters of the action. The rendition of the marks may depend on the face that is rendered on. For example, an action "ToFold" may render a dashed line on the front face, and a dash-dotted line on the back face. The rendition of marks may depend on the render purpose 515 of the rendition as shown in FIG. 5, for example, production, calibration, debugging, previewing, etc. For example, an action "ToCut" may render its action mark as conventional cut marks for the purpose of production. For example, an action "ToSeparate" may render its action mark as an arrow towards a leading edge of the sheet for the purpose of debugging. For example, an action "ToTrim" may render its action mark as a series of dashes one millimeter apart for the purpose of calibration. For example, an action "ToLeaf" may render its action mark as a shading of the leaf edge for the purpose of previewing. An action may draw no marks at all or any combination of the marks it provides for the plurality of purposes of the imposition.

A fifth step 1105 is a rendition of the objects associated with the action contained in the transaction. The rendition of an associated object comprises a plurality of sub-steps.

FIG. 11(*b*) elucidates the sub-steps of the fifth step 1105 in FIG. 11(*a*).

A loop is run over the associated objects. The sub-steps 1106-1111 are comprised in the loop.

In a first sub-step 1106, the current transformation matrix of the render medium and a current clip path of the render medium are saved. By means of the clip path it is allowed to specify a specific region of the render medium to display, rather than showing the complete render medium.

Parts of the render medium inside the clip path become visible, and parts outside are invisible. The current transformation matrix may apply to all rendering to the render medium. The current clip path may apply to all rendering to the render medium.

In a second sub-step 1107, the current transformation matrix and the current clipping path are modified. The second sub-step 1107 comprises a concatenation of the transformation computed in step 1004 of FIG. 10(*a*) to the current transformation matrix. The second sub-step 1107 also comprises the addition of a path computed in step 1005 of FIG. 10(*a*) to the current clip path.

In a third sub-step 1109, the associated object is rendered. Each object in the object vocabulary provides instructions for rendering marks on a medium. The rendition of marks may depend on the properties of the object. The rendition of marks may depend on the face being rendered and may depend on the render purpose of the rendition. For example, when the render purpose is production or the purpose is preview, an object of type PDL page will render its content property, but only if the PDL page was placed on this face, and not if it was placed on the opposite page. For example, when the render purpose is preview of the front-to-back registration, an object of type PDL page will render the content of the page placed on the opposite face using a mirror transformation, and on top of that it will render the content of the page placed on this face.

In a fourth sub-step 1110, transactions associated with the object are rendered in case the current object being rendered has been newly instantiated by the current transaction. At this point, the fourth sub-step 1110 to render a transaction is invoked recursively.

In a fifth sub-step 1111, the current transformation matrix is restored to the transformation matrix saved in the first sub-step 1107. In the fifth sub-step 1111 also the current clip path is restored to the clip path saved in the first sub-step 1107.

Alternatively the order of the first sub-step 1107 and the second sub-step 1108 may be reversed.

After a transaction has been rendered, the next transaction in the list is rendered. After the last transaction in the transaction list of the imposition has been rendered, the rendering for the corresponding face of the imposition is completed.

Figure 12:
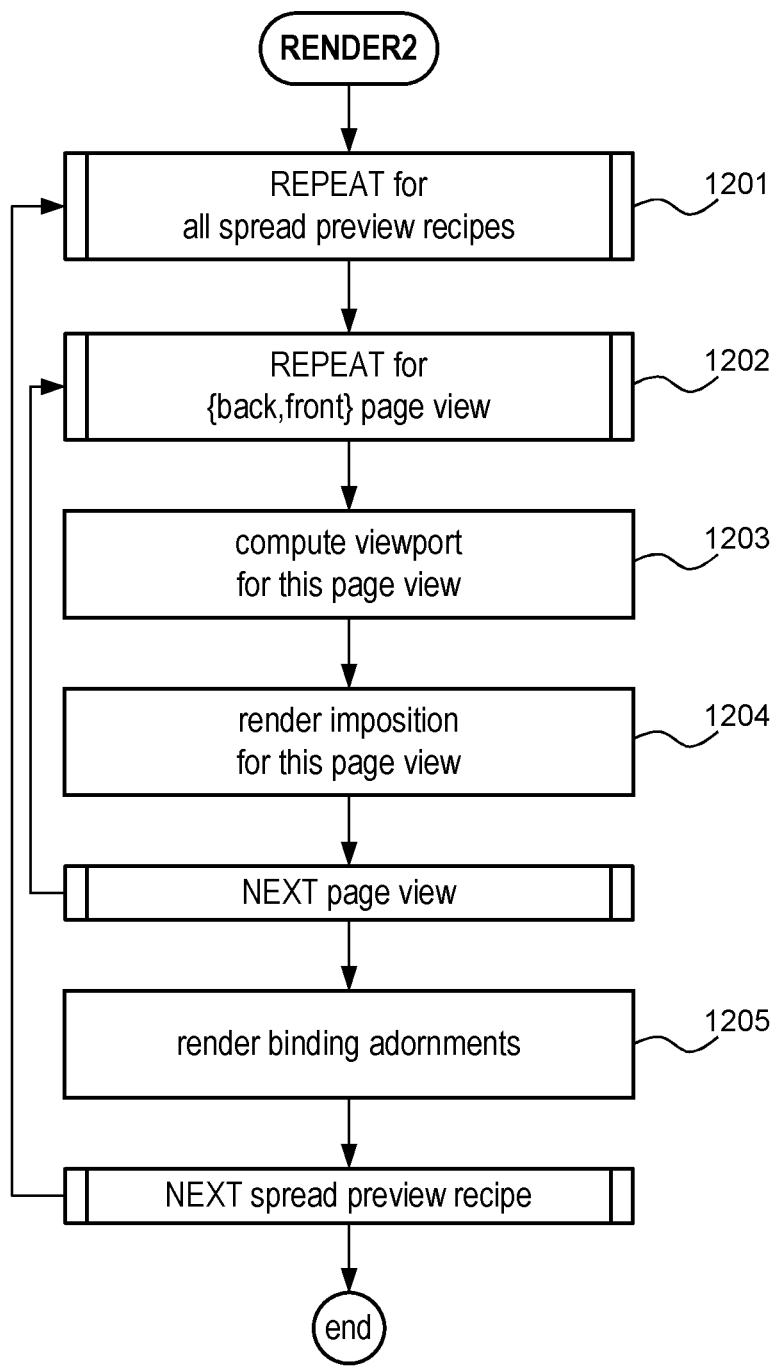
FIG. 12 is a flowchart showing a further embodiment of the rendering step of the method according to the invention in order to generate a spread preview.

FIG. 12 elucidates the second rendition step P4 of FIG. 8. FIG. 12 shows the steps to render spread preview recipes.

A first step 1201 iterates over the list of spread preview recipes and renders each spread preview recipe.

A second step 1202 iterates over the back page view and the front page view.

For each page view, a position of a viewport of the page view on the render medium is computed in a third step 1203. The position depends on the gutter 703 shown in FIG. 7(*a*). The position depends on the turning edge of the action "ToPaginate."

For each page view, a view transformation is set, a window is set, and an underlying imposition is rendered in a fourth step 1204.

In a fifth step 1205, binding adornments 704, which are shown in FIG. 7(*a*), are rendered.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A document processing system for processing a print job to produce a document comprising at least one sheet, the print job having a plurality of print job settings specifying a plurality of actions on a physical start product and specifying a desired end product, the document processing system comprising:
   at least one printer;
   at least one finisher;
   the at least one printer and at least one finisher being connected by means of a data connection for exchanging digital information about printing and finishing instructions,
   a simulation module configured to digitally generate a digital assembly of the at least one sheet with a production route model of at least one function leading to the plurality of actions,
   wherein the generation of the digital sheet assembly of the at least one sheet uses three items as digital input, the three items including:
      the plurality of print job settings;
      at least one digital representation of the at least one sheet of the physical start product; and
      digital pages derived from at least one digital source file, and
   wherein the digital assembly of the at least one sheet comprises a set of transitions that result from performing the plurality of actions, each transition being one out of a modification of a value of a property of a sheet, a creation of a relationship between sheets, a termination of a relationship between sheets, a creation of a sheet, and a destruction of a sheet;
   an extraction module configured to digitally extract a digital document imposition recipe from the digital assembly of the at least one sheet, the digital document imposition recipe comprising a set of digital imposition descriptions generated by computing, for each transition performed on the digital assembly of the at least one sheet, transformations that express a change of a coordinate system used for the transition and parameters that specify the actions related to the transition; and
   a rendition module configured to digitally render the digital imposition descriptions of the digital document imposition recipe, the rendering being based on the at least one digital source file and a render purpose, in order to deliver digital imposition images in a target format, the digital imposition images comprising at least placement of content of pages of the at least one digital source file and comprising action marks related to the plurality of actions, the digital imposition images being suitable for subsequent display on a user interface of the document processing system and/or being suitable for digital input to the at least one finisher by means of the data connection for subsequent processing on the at least one finisher, and/or for digital input for subsequent processing on the at least one printer.

2. The document processing system according to claim 1, wherein the digital document imposition recipe comprises, for each sheet that is going to be printed by the at least one printer, a digital sheet imposition recipe generated by computing transformations and parameters for each transition performed on said sheet.

3. The document processing system according to claim 2, wherein each digital sheet imposition recipe comprises a digital sheet front imposition recipe generated by computing transformations and parameters for each transition performed on a front side of the sheet and a digital sheet back imposition recipe generated by computing transformations and parameters for each transition performed on the back side of the sheet.

4. The document processing system according to claim 1, wherein the rendition module is configured to render each digital sheet imposition recipe for a front face of the sheet and for a back face of the sheet.

5. The document processing system according to claim 1, wherein the extraction module is configured to extract a digital spread preview recipe from the digital assembly of the at least one sheet, the digital spread preview recipe comprising a set of digital spread preview descriptions comprising a digital subset of the transitions from the digital assembly of the at least one sheet suitable for rendering the set of spread preview descriptions, and
   wherein the document processing system further comprises a second rendition module configured to render the digital spread preview descriptions in the spread preview recipe based on the digital imposition images in order to deliver spread previews in a target format, the spread previews describing at least placement of page content and action marks, and the spread previews being suitable for subsequent viewing on the user interface and/or being suitable for subsequent processing on the at least one printer and/or on the at least one finisher.

6. The document processing system according to claim 5, wherein the target format of the delivered digital spread preview further describes binding adornments.

7. The document processing system according to claim 1, wherein the at least one sheet is a pre-processed sheet and the simulation module is configured to include an at least one pre-process action related to the pre-processed sheet in the digital assembly of the at least one sheet.

8. A method for processing with a document processing system comprising at least one printer and at least one finisher, the at least one printer and the at least one finisher being connected by means of a data connection for exchanging digital information about printing and finishing instructions, a print job to produce a document comprising at least one sheet, the print job specifying a plurality of actions on a physical start product and specifying a desired end product, the method comprising the steps of:
   digitally generating a digital assembly of the at least one sheet with a production route model of at least one function leading to the plurality of actions, the generation of the digital assembly of the at least one sheet using three items as digital input, the three items including:

a plurality of print job settings;
at least one digital representation of the at least one sheet of the physical start product; and
digital pages derived from at least one digital source file,
wherein the digital assembly of the at least one sheet comprises a set of transitions that result from performing the plurality of actions, each transition being one out of a modification of a value of a property of a sheet, a creation of a relationship between sheets, a termination of a relationship between sheets, a creation of a sheet, and a destruction of a sheet;
digitally extracting a digital document imposition recipe from the digital assembly of the at least one sheet, the digital document imposition recipe comprising a set of digital imposition descriptions generated by computing, for each transition performed on the digital assembly of the at least one sheet, transformations that express a change of a coordinate system used for the transition and parameters that specify the actions related to the transition; and
digitally rendering the digital imposition descriptions of the digital document imposition recipe, the rendering being based on the at least one digital source file in order to deliver digital imposition images in a target format, the digital imposition images comprising at least placement of content of pages of the at least one digital source file and comprising action marks, the digital imposition images being suitable for subsequent displaying of the digital imposition images on a user interface of the document processing system and/or being suitable for digital input to the at least one finisher by means of the data connection for subsequent processing on the at least one finisher and/or for digital input for subsequent processing on the at least one printer.

9. The method according to claim 8, wherein the digital document imposition recipe comprises, for each sheet that is going to be printed by the at least one printer, a digital sheet imposition recipe generated by computing transformations and parameters for each transition performed on said sheet.

10. The method according to claim 9, wherein the rendering step comprises, for each digital sheet imposition recipe, the step of rendering a front face of the sheet and the step of rendering a back face of the sheet.

11. The method according to claim 10, wherein each sheet imposition recipe comprises a digital sheet front imposition recipe generated by computing transformations and parameters for each transition performed on a front side of the sheet and a digital sheet back imposition recipe generated by computing transformations and parameters for each transition performed on the back side of the sheet.

12. The method according to claim 9, wherein each digital sheet imposition recipe comprises a digital sheet front imposition recipe generated by computing transformations and parameters for each transition performed on a front side of the sheet and a digital sheet back imposition recipe generated by computing transformations and parameters for each transition performed on the back side of the sheet.

13. The method according to claim 8, further comprising the steps of:
extracting a digital spread preview recipe from the digital assembly of the at least one sheet, the spread preview recipe comprising a set of digital spread preview descriptions comprising a subset of the transitions from the digital assembly of the at least one sheet suitable for rendering the set of digital spread preview descriptions; and
rendering the digital spread preview descriptions in the digital spread preview recipe based on the digital imposition images in order to deliver digital spread previews in a target format describing at least placement of page content and action marks,
wherein the digital spread previews are suitable for subsequent viewing on the user interface and/or being suitable for digital input for subsequent processing on the at least one printer and/or on the at least one finisher.

14. A non-transitory recording medium comprising computer executable program code configured to instruct at least one computer to perform the method according to claim 8 in order to process a print job on a document processing system.

* * * * *